US012558775B2

(12) United States Patent
Ko et al.

(10) Patent No.: US 12,558,775 B2
(45) Date of Patent: Feb. 24, 2026

(54) ROBOT APPARATUS AND ROBOT SYSTEM

(71) Applicant: SAMSUNG ELECTRONICS CO., LTD., Suwon-si (KR)

(72) Inventors: Jongseong Ko, Suwon-si (KR); Pyungkang Kim, Suwon-si (KR); Junhyeok Park, Suwon-si (KR); Donghyun Kim, Suwon-si (KR); Jungjoon Park, Suwon-si (KR); Hyoin Kim, Suwon-si (KR); Jungjun Park, Suwon-si (KR); Kongwoo Lee, Suwon-si (KR); Hyunyoung Lee, Suwon-si (KR); Beomsoo Hwang, Suwon-si (KR); Seojoo Choi, Suwon-si (KR)

(73) Assignee: Samsung Electronics Co., Ltd.

( * ) Notice: Subject to any disclaimer, the term of this patent is extended or adjusted under 35 U.S.C. 154(b) by 145 days.

(21) Appl. No.: 18/639,076

(22) Filed: Apr. 18, 2024

(65) Prior Publication Data

US 2025/0073892 A1      Mar. 6, 2025

(30) Foreign Application Priority Data

Aug. 29, 2023   (KR) ........................ 10-2023-0113584

(51) Int. Cl.
| | |
|---|---|
| *B25J 15/08* | (2006.01) |
| *B25J 9/00* | (2006.01) |
| *B25J 9/16* | (2006.01) |

(52) U.S. Cl.
CPC ........... *B25J 9/0087* (2013.01); *B25J 9/0009* (2013.01); *B25J 9/1664* (2013.01); *B25J 15/08* (2013.01)

(58) Field of Classification Search
CPC ...... B25J 9/0087; B25J 9/0009; B25J 9/1664; B25J 15/08; B25J 9/0084; B25J 21/00; B25J 9/0096; B25J 5/00; B25J 9/08; B25J 9/1682; B25J 11/00; B25J 19/0029
USPC ......................................................... 700/248
See application file for complete search history.

(56) References Cited

U.S. PATENT DOCUMENTS

| | | | |
|---|---|---|---|
| 9,498,860 B2 | 11/2016 | Takahashi | |
| 9,908,239 B1 | 3/2018 | O'Brien et al. | |
| 10,338,597 B2 | 7/2019 | Hashimoto et al. | |
| 10,692,834 B2 | 6/2020 | Kim et al. | |
| 10,935,980 B2 | 3/2021 | Mukherjee et al. | |
| 11,015,324 B2 | 5/2021 | Clarke et al. | |
| 11,173,603 B2 * | 11/2021 | Ooba ..................... B25J 9/1664 |
| 11,376,747 B2 * | 7/2022 | Yamamoto ............. B25J 9/1674 |
| 11,628,963 B2 | 4/2023 | Nishio et al. | |

(Continued)

*Primary Examiner* — Kira Nguyen
(74) *Attorney, Agent, or Firm* — Fish & Richardson P.C.

(57) ABSTRACT

Disclosed are a robot apparatus and a robot system. The robot apparatus includes a first robot unit supported by a frame structure and a second robot unit disposed under the frame structure and configured to move the first robot unit. The first robot unit includes first and second robot arms with first and second tool replacement portions. Tools to perform work are mounted on the replacement portions. A robot arm moving module is configured to move each of the first and second robot arms in a vertical direction. The robot system also includes a work table and a work table moving module configured to move the work table in all three directions. A controller inside the frame structure controls the movement of the robot arms and also of the work table.

20 Claims, 28 Drawing Sheets

(56)  References Cited

U.S. PATENT DOCUMENTS

| | | | |
|---|---|---|---|
| 2013/0055560 A1* | 3/2013 | Nakasugi | B23P 21/004 |
| | | | 29/700 |
| 2013/0085604 A1* | 4/2013 | Irie | B25J 9/1697 |
| | | | 901/46 |
| 2014/0277721 A1* | 9/2014 | Tomo | B25J 15/06 |
| | | | 414/752.1 |
| 2016/0306340 A1 | 10/2016 | Nammoto et al. | |
| 2020/0064817 A1* | 2/2020 | Askey | B25J 9/1684 |
| 2020/0353511 A1* | 11/2020 | Larsson | B08B 1/12 |
| 2021/0053228 A1 | 2/2021 | Jessen et al. | |
| 2021/0339350 A1 | 11/2021 | Sawachi et al. | |
| 2022/0026538 A1 | 1/2022 | Kamakura | |

* cited by examiner

Figure 16:
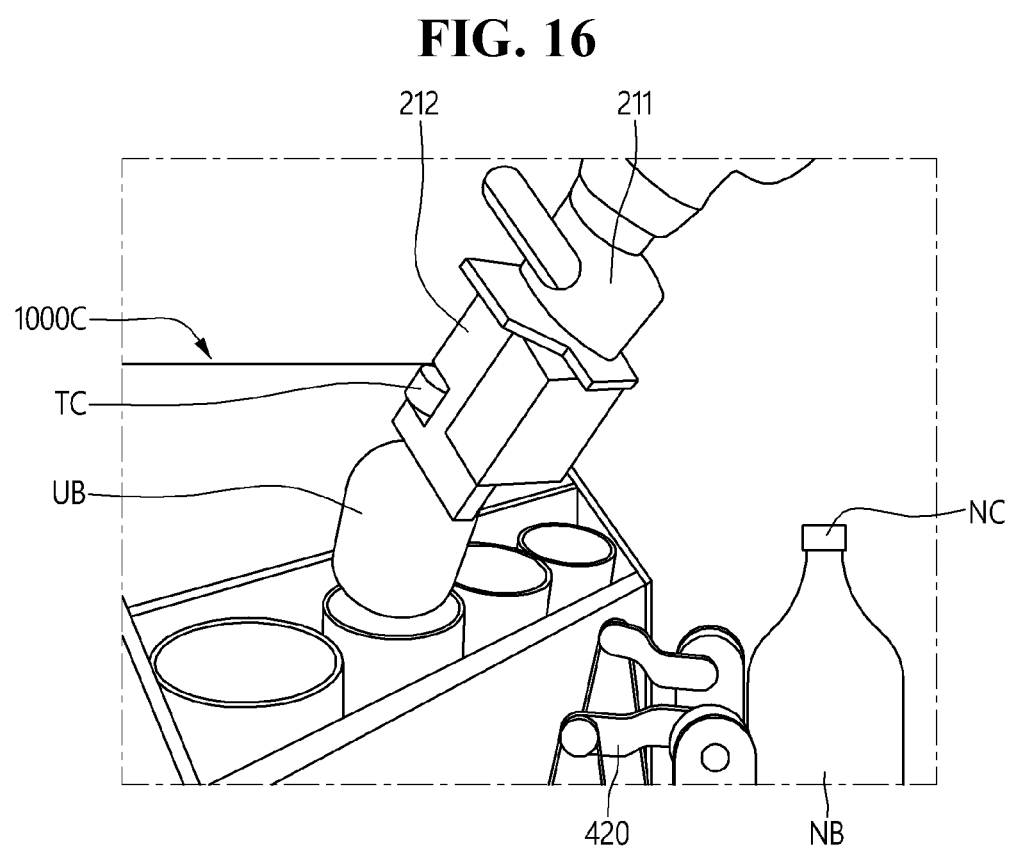

ROBOT APPARATUS AND ROBOT SYSTEM

CROSS-REFERENCE TO RELATED APPLICATION

This application claims priority from Korean Patent Application No. 10-2023-0113584 filed on Aug. 29, 2023 in the Korean Intellectual Property Office, and all the benefits accruing therefrom under 35 U.S.C. 119, the contents of which in its entirety are herein incorporated by reference.

BACKGROUND

Maintenance and repair work (PM; Preventive Maintenance) of a semiconductor facility involves various tasks performed directly by a human worker. However, when there is a risk of the worker's exposure to hazardous substances or the work is simple and repetitive, there is a need to use a robot to replace a human worker.

In this regard, when using the robot, various tasks must be performed by the robot smoothly in a similar manner to a case when the human worker performs them directly. For example, there is an increased need to introduce a robot apparatus that can perform multiple tasks simultaneously and that can reach various positions and vertical levels of a work target.

SUMMARY

The present disclosure relates to a robot apparatus and system that can perform multiple tasks simultaneously and can reach various positions and vertical levels of a work target.

Purposes according to the present disclosure are not limited to the above-mentioned purposes. Other purposes and advantages according to the present disclosure that are not mentioned may be understood based on following detailed description and may be more clearly understood based on implementations according to the present disclosure. Further, it will be easily understood that the purposes and advantages according to the present disclosure may be realized using means shown in the claims or combinations thereof.

A robot apparatus according to some implementations of the present disclosure to achieve the above purpose includes a first robot unit supported by a frame structure; and a second robot unit disposed under the frame structure and configured to drive the first robot unit, wherein the first robot unit includes: first and second robot arms including, at one ends thereof, first and second tool replacement portions, respectively, wherein first and second tools to perform work are mounted on the first and second tool replacement portions, respectively; a robot arm moving module configured to move each of the first and second robot arms in a vertical direction; a work table on which a work target subjected to the work is loaded; a work table moving module configured to move the work table in each of the vertical direction and first and second horizontal directions intersecting each other; a controller disposed inside the frame structure and configured to control each of the movement of each of the first and second robot arms and the movement of the work table.

A robot system according to some implementations of the present disclosure to achieve the above purpose includes a cabinet in which a replacement work target is loaded; and a robot apparatus configured to perform the replacement work, wherein the robot apparatus includes: first and second robot arms having first and second grippers to perform the replacement work mounted thereon, respectively; a work table on which the replacement work is performed; a moving module configured to move each of the first and second robot arms and the work table; and a controller configured to control the moving module, wherein the moving module includes: first and second vertical moving units configured to respectively move the first and second robot arms in a vertical direction; a third vertical moving unit configured to move the work table in the vertical direction; and first and second horizontal moving units configured to move the work table in first and second horizontal directions intersecting the vertical direction, respectively, wherein the controller is configured to: move the first robot arm in the vertical direction so that the first gripper is mounted on the first robot arm; rotate the work table such that an extension direction of the work table is parallel to the first horizontal direction; and move the first robot arm in the first horizontal direction to perform the replacement work.

A robot apparatus according to some implementations of the present disclosure to achieve the above purpose includes a first robot unit supported by a frame structure; and a second robot unit disposed under the frame structure and configured to drive the first robot unit, wherein the first robot unit includes: first and second robot arms disposed on a first surface of the frame structure, wherein each of the first and second robot arms includes a plurality of rotatable articulations; first and second tool replacement portions disposed at one ends of the first and second robot arms, respectively; first and second grippers respectively mounted on the first and second tool replacement portions; a work target loaded portion on which a work target is loaded, wherein the work target loaded portion is disposed under the first and second robot arms; a moving module configured to move each of the first and second robot arms and the work target loaded portion; and a controller disposed inside the frame structure and configured to control the moving module, wherein the moving module includes: first and second vertical moving units configured to respectively move the first and second robot arms in a vertical direction; a third vertical moving unit configured to move the work target loaded portion in the vertical direction; and first and second horizontal moving units configured to move the work target loaded portion in first and second horizontal directions intersecting the vertical direction, respectively, wherein the third vertical moving unit is disposed between the first and second vertical moving units.

Details of other implementations are included in the detailed description and drawings.

BRIEF DESCRIPTION OF THE DRAWINGS

The above and other aspects and features of the present disclosure will become more apparent by describing in detail illustrative implementations thereof with reference to the attached drawings, in which:

FIGS. 2 to 6 are example diagrams for illustrating a robot apparatus;

FIGS. 8 to 28 are example diagrams for illustrating an operation of a robot apparatus.

DETAILED DESCRIPTIONS

Figure 1:
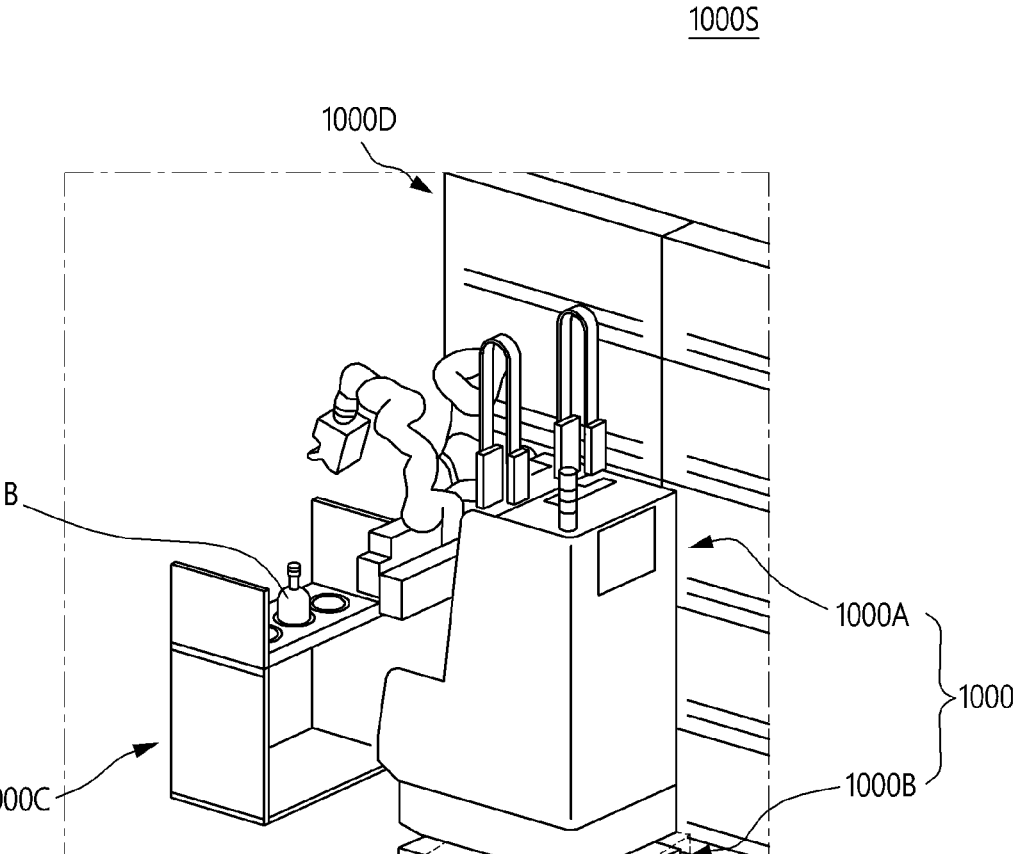
FIG. 1 is an example diagram for schematically illustrating a robot system.

For simplicity and clarity of illustration, elements in the drawings are not necessarily drawn to scale. The same reference numbers in different drawings represent the same or similar elements and as such perform similar functions. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included in the spirit and scope of the present disclosure as defined by the appended claims.

A shape, a size, a ratio, an angle, a number, etc. disclosed in the drawings for illustrating embodiments of the present disclosure are illustrative and the present disclosure is not limited thereto. The same reference numerals refer to the same elements herein.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of list of elements and may not modify the individual elements of the list. When referring to "C to D", this means C inclusive to D inclusive unless otherwise specified.

It will be understood that, although the terms "first", "second", "third", and so on may be used herein to illustrate various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", "connected with", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the present disclosure may be partially or entirely combined with each other and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of illustration to illustrate one element or feature's relationship to another element or feature as illustrated in the figures. It will be understood that the spatially relative terms are intended to encompass different orientations of the device in use or in operation, in addition to the orientation depicted in the figures. For example, when the device in the drawings may be turned over, elements described as "below" or "beneath" or "under" other elements or features would then be oriented "above" the other elements or features. Thus, the example terms "below" and "under" may encompass both an orientation of above and below. The device may be otherwise oriented, for example, rotated 90 degrees or at other orientations and the spatially relative descriptors used herein should be interpreted accordingly.

Hereinafter, with reference to FIGS. 1 to 6, an example robot apparatus and an example robot system are described.

FIG. 1 is an example diagram for schematically illustrating a robot system. FIGS. 2 to 6 are example diagrams for illustrating a robot apparatus.

In some implementations, first and second horizontal directions X and Y may mean directions that are parallel to an upper surface 100U of a frame structure 100 as described later and intersect each other in a perpendicular manner to each other. A third direction Z may mean a direction that is perpendicular to the upper surface 100U of the frame structure 100 and intersects each of the first and second horizontal directions X and Y.

Referring to FIG. 1, a robot system 1000S may include a robot apparatus 1000, a cabinet 1000C, and a work target facility 1000D. The robot apparatus 1000 may include a first robot unit 1000A and a second robot unit 1000B. The cabinet 1000C may refer to a space where a bottle B containing therein a chemical (e.g., PR (Photo Resist)) needs to be replaced.

The first robot unit 1000A may include a robot arm 200, a robot arm moving module 300, a work table 400, and a work table moving module 500.

Figure 2:
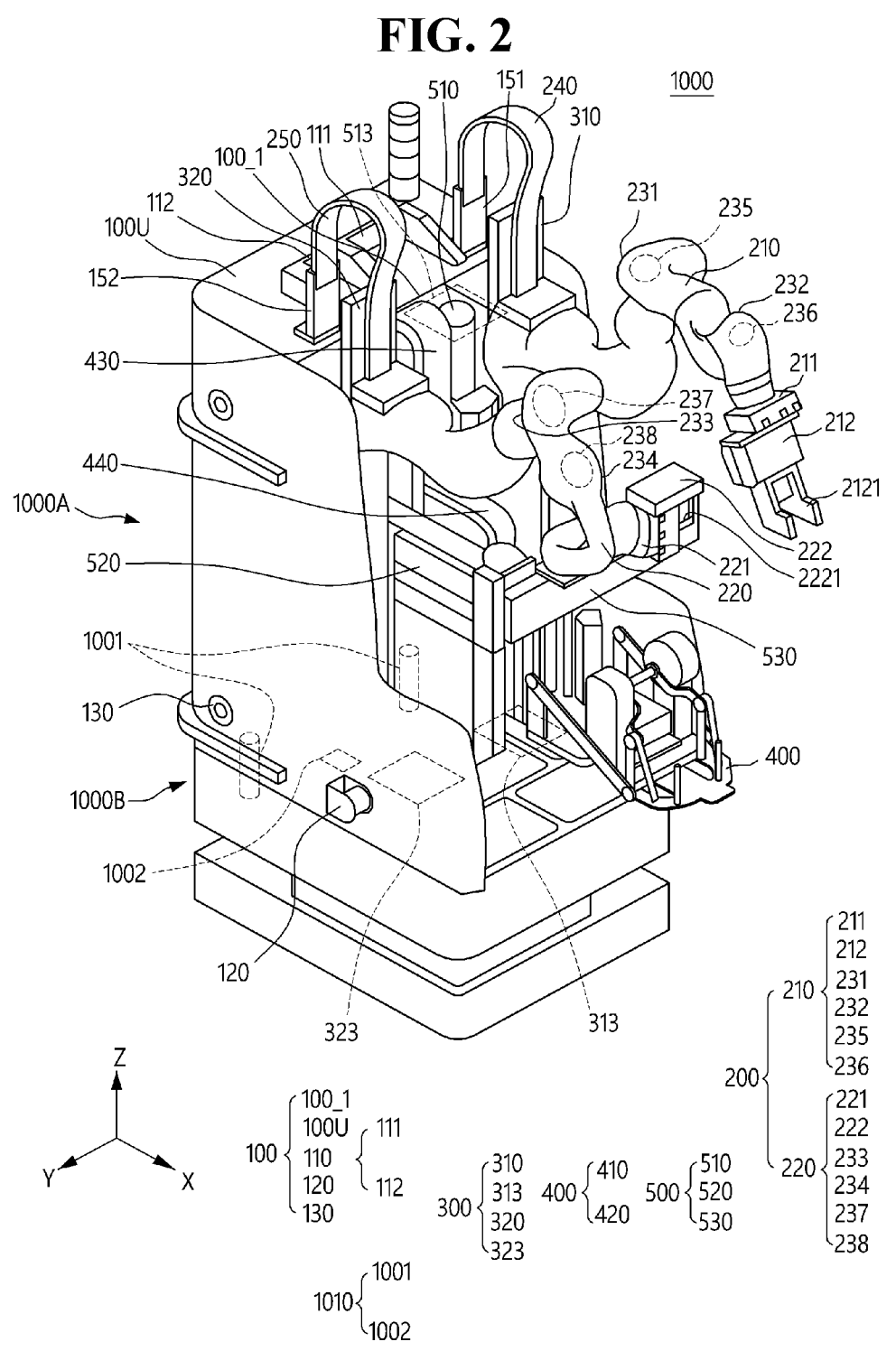

Referring to FIG. 2, the frame structure 100 may support the first robot unit 1000A. The frame structure 100 may include tool storage 110, a sensor 120, a ventilation unit 130, and an exhaust unit.

The tool storage 110 may refer to an internal space of the frame structure 100 where first and second tools 212 and 222, which will be described later, are loaded. The tool storage 110 may include first tool storage 111 in which the first tool 212 is loaded and second tool storage 112 in which the second tool 222 is loaded.

The sensor 120 may be disposed on each of both opposing sides in the second horizontal direction Y of the frame structure 100. The sensor 120 may detect a sensing target, for example, a worker, within a work area when the robot apparatus 1000 performs work. For example, the sensor 120 may detect whether the worker enters an area where replacement work by the robot apparatus 1000 is performed and may prevent danger to the worker based on the detection result.

The ventilation unit 130 may be disposed on a side of the frame structure 100 and may ventilate an inside of the first robot unit 1000A. The ventilation unit 130 may control airflow inside the frame structure 100 to cool the inside thereof. Although not specifically shown, the ventilation unit 130 may include a filter to reduce generation of particles inside the frame structure 100.

Although not specifically shown, an exhaust unit may be disposed adjacent to the work table 400 and may discharge harmful substances generated during the work out of the robot apparatus 1000. For example, the exhaust unit may remove the harmful substances generated from the chemical during a process of replacing a bottle B containing the PR chemical. Although not specifically shown, the robot apparatus 1000 may discharge the harmful substances out thereof using a fan.

The robot arm 200 may include first and second robot arms 210 and 220, which are spaced apart from each other and are disposed within the frame structure 100. Although the drawing shows two robot arms, the present disclosure is not limited thereto.

The first robot arm 210 may include a plurality of articulations 231 and 232 and a plurality of motors 235 and 236 for driving the plurality of articulations 231 and 232, respectively. The second robot arm 220 may include a plurality of articulations 233 and 234 and a plurality of motors 237 and 238 for driving the plurality of articulations 233 and 234, respectively.

For example, each of the first and second robot arms 210 and 220 may have 6 or 7 articulations to have 6 or 7 degrees of freedom in a space. In each of the first and second robot arms 210 and 220, the plurality of motors may correspond to the plurality of articulations, respectively. However, the articulations and the motors as shown in FIG. 2 are illustrative and the number and the location of the articulations and the motors are not limited to those as shown in the drawing.

The plurality of articulations 231, 232, 233, and 234 may rotate in different directions around rotation axes, respectively. For example, each of the first and second robot arms 210 and 220 may comprise a vertical multi-joint robot arm.

In another example, each of the first and second robot arms 210 and 220 of the robot apparatus 1000 may comprise a horizontal multi-joint robot arm.

The first and second robot arms 210 and 220 may further include first and second tool replacement portions 211 and 221 and first and second tools 212 and 222 disposed at respective one ends thereof, respectively. The first and second tools 212 and 222 may be removably mounted on the first and second tool replacement portions 211 and 221, respectively.

Figure 3:
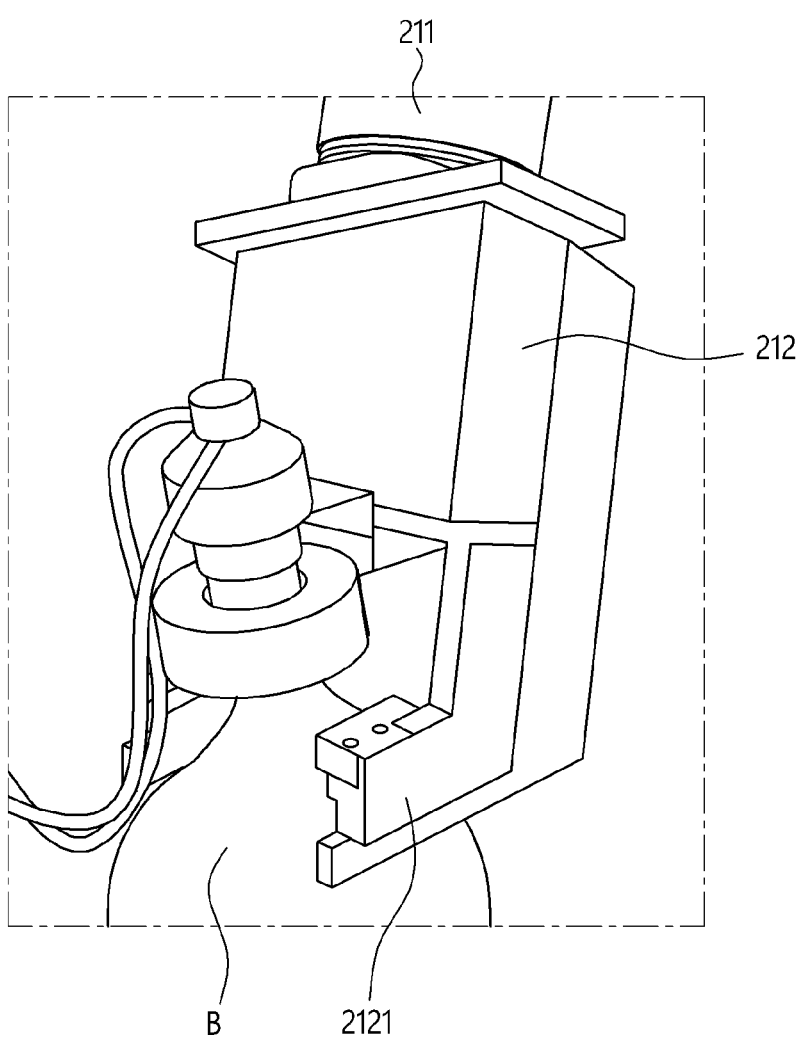
Figure 17:
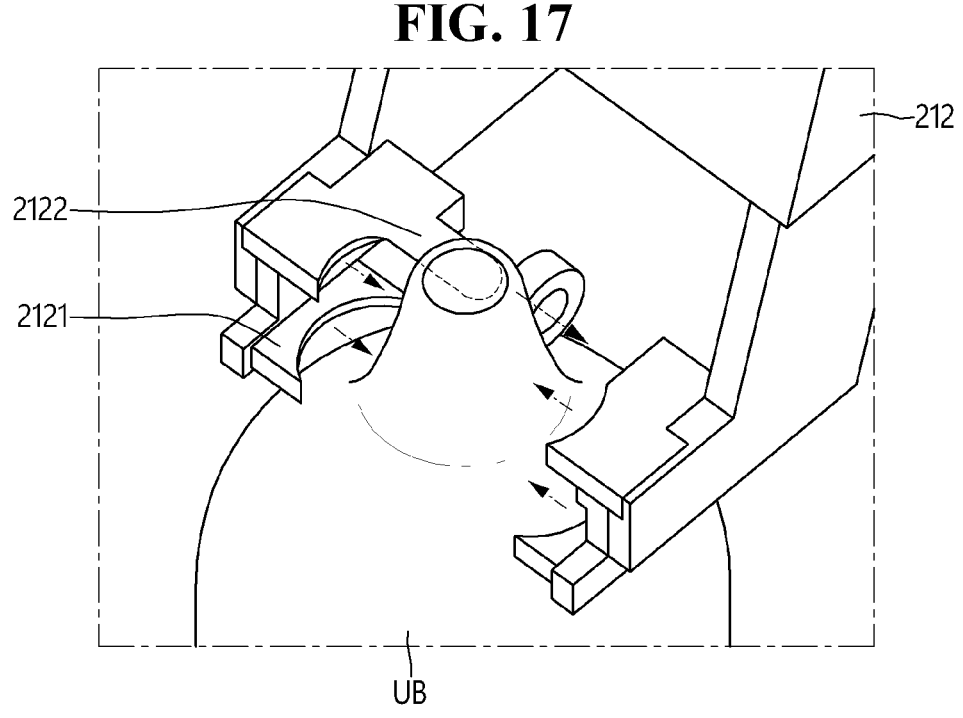

Referring to FIG. 2, FIG. 3, and FIG. 17 described later, the first tool 212 may include a first-first finger 2121 and a first-second finger (2122 in FIG. 17) described later. The second tool 222 may include a second finger 2221. In one example, a shape of the first-first finger 2121 as shown in FIG. 2 is schematically or illustratively shown and may be described in more detail using FIG. 17. Accordingly, the shape of each of the first and second robot arms 210 and 220 as shown in FIG. 2 may be somewhat different from a shape of each of the first and second robot arms 210 and 220 as described using FIGS. 3 to 5 and FIGS. 8 to 28.

Although not specifically shown, the first and second tools 212 and 222 may further include motors for driving the first-first and first-second fingers 2121 and 2122 and the second finger 2221, respectively.

The first and second tools 212 and 222 may be removably mounted on the first and second robot arms 210 and 220, respectively. For example, the first tool 212 may be mounted on the first robot arm 210, and the second tool 222 may be mounted on the second robot arm 220. In another example, the first and second tools 212, 222 may be mounted on the second and first robot arms 220, 210, respectively, in a cross manner. In this case, the first tool 212 may be mounted on the second robot arm 220, and the second tool 222 may be mounted on the first robot arm 210.

In some implementations, each of the first and second tools 212 and 222 may refer to a gripper used to perform the work of replacing the bottle B. In one example, the first and second tools 212 and 222 are not limited to the grippers and may be replaced with various tools for the robot apparatus 1000 to perform various works. For example, although not specifically shown, each of the first and second tools 212 and 222 may be a bolt fastening device rather than the gripper.

Although not specifically shown, the first tool replacement portion 211 and the first tool 212 may be supported on and be coupled to each other via a plurality of bearings which have different diameters and are independently rotatable. For example, the first tool replacement portion 211 and the first tool 212 may be supported on and be coupled to each other via a first bearing having a first diameter and a second bearing having a diameter smaller than the first diameter and disposed inwardly of the first bearing.

Although not specifically shown, for example, the first tool replacement portion 211 and the first tool 212 may be aligned with each other using a guide pin. Furthermore, the first tool replacement portion 211 and the first tool 212 may be coupled to each other via a combination of a protrusion and a groove.

The description of the coupling and the alignment between the first tool replacement portion 211 and the first tool 212 as set forth above may be similarly applied to the coupling and the alignment between the second tool replacement portion 221 and the second tool 222.

The robot arm moving module 300 may move each of the first and second robot arms 210 and 220 in the vertical direction Z.

Referring to FIG. 2, the robot arm moving module 300 may include a first vertical moving unit 310 and a first motor 313 and a second vertical moving unit 320 and a second motor 323. The first vertical moving unit 310 and the second vertical moving unit 320 may be spaced apart from each other in the second horizontal direction Y.

The first vertical moving unit 310 may be disposed at the other end of the first robot arm 210 and may move the first robot arm 210 in the vertical direction Z. The first motor 313 may be disposed under the first vertical moving unit 310 and may drive the first vertical moving unit 310 in the vertical direction Z.

When the first and second motors 313 and 323 drive the first and second vertical moving units 310 and 320 in the vertical direction, respectively, the first and second robot arms 210 and 220 may move, in the vertical direction Z, from a bottom surface of a work space flush with a bottom surface of the cabinet 1000C to a predetermined vertical level of the cabinet 1000C at which the replacement work is performed. For example, each of the first and second robot arms 210 and 220 may move from the bottom surface of the work space to a vertical level corresponding to the worker's eye level.

For example, each of the first and second robot arms 210 and 220 may move in the vertical direction Z to reach an entirety of an area within a reach of the worker's hand, for example, an area from 0 mm to a maximum of 1500 mm in a vertical direction.

Figure 4:
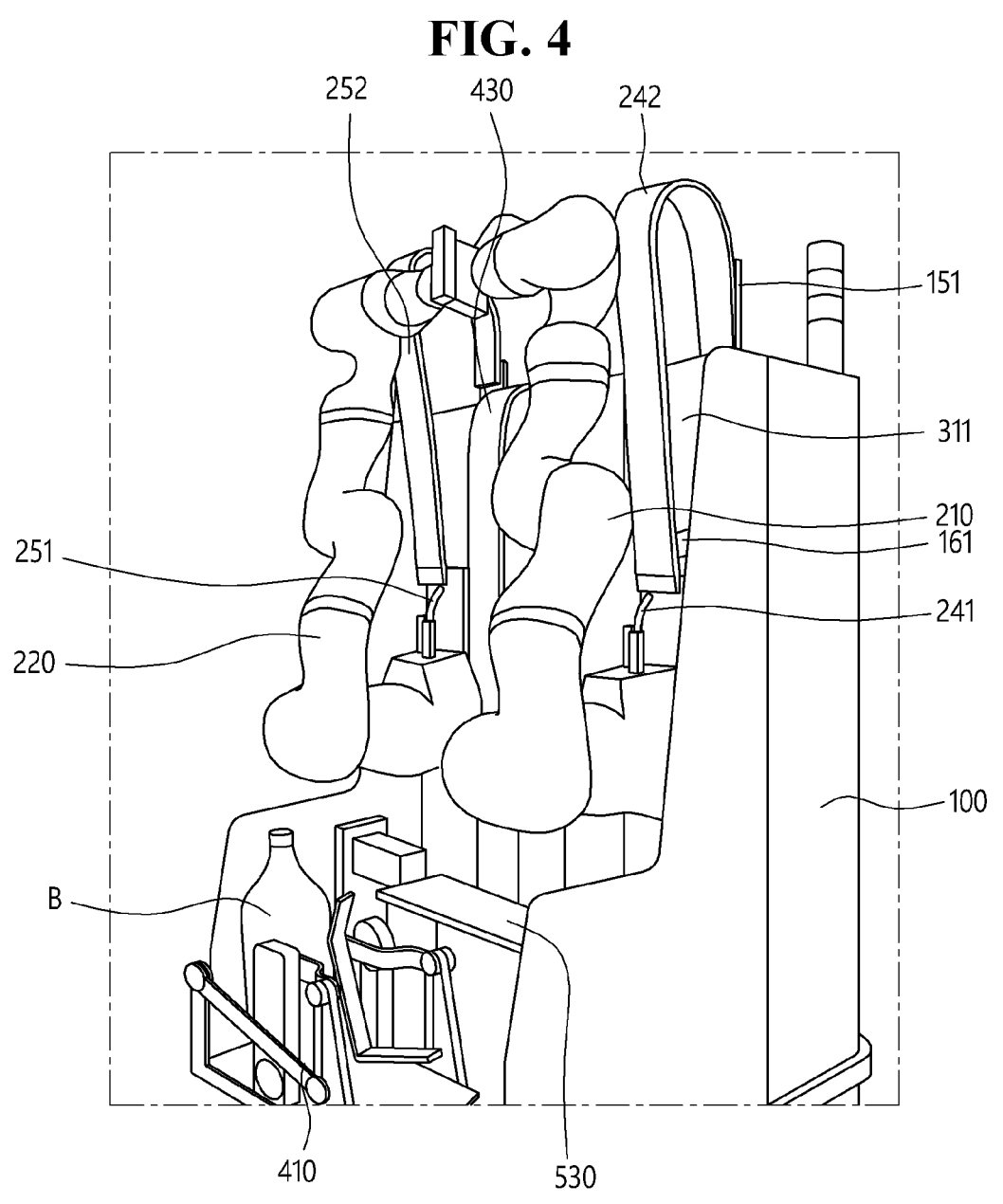
Figure 5:
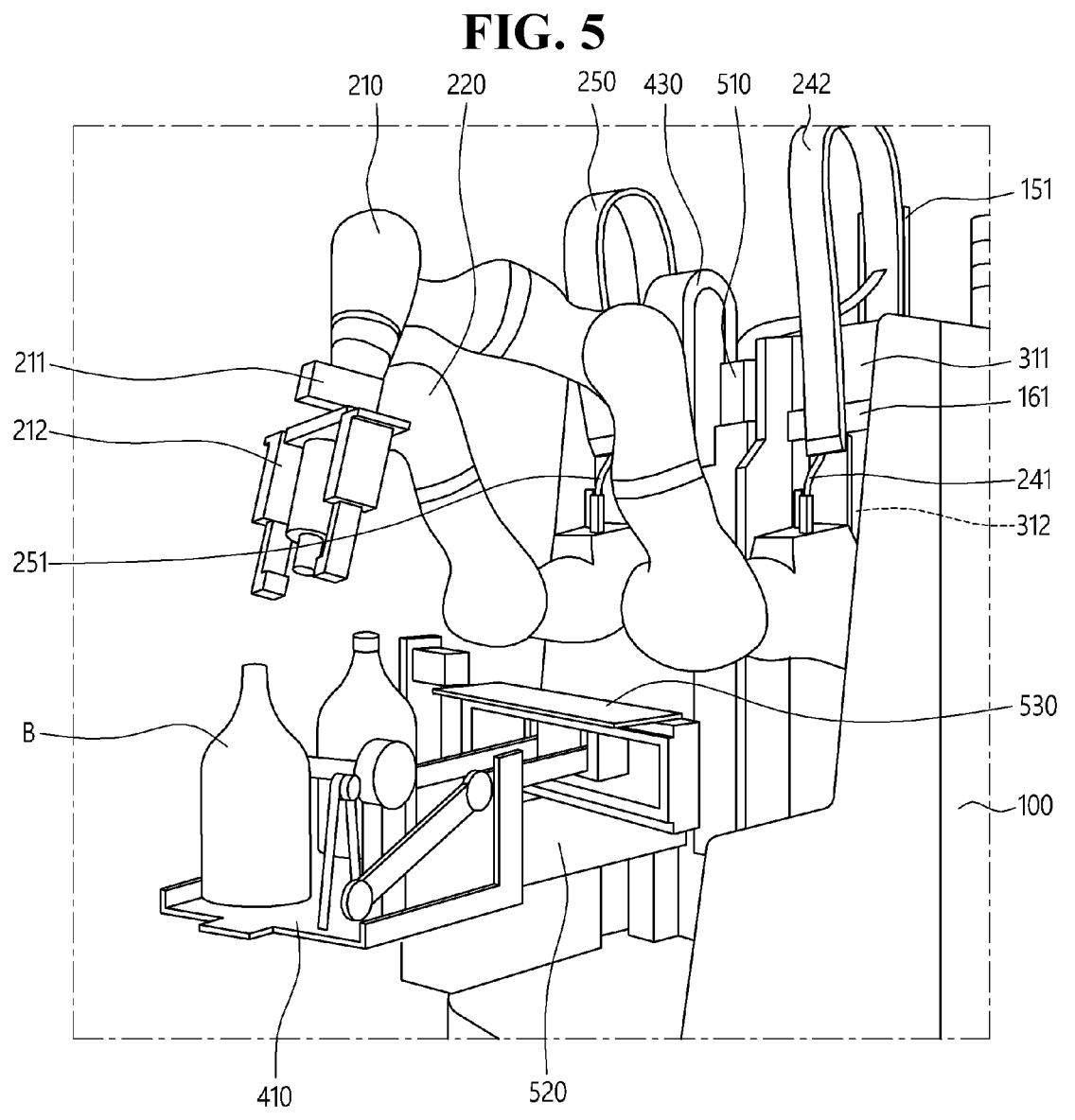

Referring to FIG. 2, FIG. 4 and FIG. 5, the first vertical moving unit 310 may include a first vertical movement shaft 311 and a first slider 312 attached to the first vertical movement shaft 311 so as to be movable in the vertical direction Z. As the first slider 312 is raised and lowered in the vertical direction Z on and along the first vertical movement shaft 311, the first robot arm 210 may be raised and lowered in the vertical direction Z. The first slider 312 may be disposed under a first path support frame 161.

Power of the first motor 313 may be converted into movement of the first slider 312.

The second vertical moving unit 320 may be disposed at the other end of the second robot arm 220 and may move the second robot arm 220 in the vertical direction Z. The second motor 323 may be disposed under the second vertical moving unit 320 and may drive the second vertical moving unit 320 in the vertical direction Z.

Although not specifically shown, the second vertical moving unit 320 may include a second vertical movement shaft and a second slider attached to the second vertical movement shaft so as to be movable in the vertical direction Z. As the second slider is raised and lowered in the vertical direction Z on and along the second vertical movement shaft, the second robot arm 220 may be raised and lowered in the vertical direction Z.

Power of the second motor 323 may be converted to movement of the second slider.

The work table 400 may provide a space onto which a work target, that is, the bottle B, is loaded and transported to and in which the work is performed.

The work table 400 includes a work target loaded portion 410 for loading the bottle B thereon, a fixing unit (420 in FIG. 19) for fixing the bottle B, and a motor (not shown) for driving the work table 400.

In some implementations, the work target loaded portion 410 may refer to a space used to perform the work of replacing the bottle B. In one example, although not specifically shown, instead of the bottle B but a bolt fastening device may be loaded on the work target loaded portion 410.

In one example, the work target loaded portion 410 may have various shapes depending on a type of a product loaded thereon, and the shape of the work target loaded portion 410 is not limited to that as shown in the drawing.

In one example, a shape of the work table 400 as shown in FIG. 2 is shown schematically or by way of example and may be described in more detail using FIGS. 4 to 5 and FIGS. 8 to 28. Accordingly, the shape of the work table 400 as shown in FIG. 2 may be somewhat different from a shape of the work table 400 as described using FIGS. 4 to 5 and FIG. 8 to FIG. 28.

A work table moving module 500 may move the work table 400 in each of the vertical direction Z and the first and second horizontal directions X and Y.

Referring to FIG. 2, the work table moving module 500 may include a third vertical moving unit 510 that moves the work table 400 in the vertical direction Z and first and second horizontal moving units 520 and 530 that move the work table 400 in the first and second horizontal directions X and Y, respectively. The third vertical moving unit 510 may be disposed between the first and second vertical moving units 310 and 320 in the first horizontal direction X.

The work table moving module 500 may further include a third motor 513 that drives the third vertical moving unit 510 and is disposed on top of the third vertical moving unit 510.

The second horizontal moving unit 530 (Y-direction) may be disposed closer to the work table 400 than the first horizontal moving unit 520 (X-direction). In other words, the first horizontal moving unit 520 may be disposed closer to the first and second vertical moving units 310 and 320 than the second horizontal moving unit 530 may be. That is, a spacing between the second horizontal moving unit 530 and a first surface 100_1 of the frame structure 100 on which the first and second robot arms 210 and 220 are disposed may be larger than a spacing between the first horizontal moving unit 520 and the first surface 100_1.

Under the movement of the first horizontal moving unit 520, the work table 400 may move in the first horizontal direction X and inside or outside the frame structure 100.

Under the movement of the second horizontal moving unit 530, the work table 400 may move in the second horizontal direction Y and inside the frame structure 100.

Referring to FIG. 4 and FIG. 5, under control of a controller (600 in FIG. 6), the first robot arm 210 may move in the vertical direction Z so that the first tool 212 may be mounted to the first robot arm 210. Afterwards, the work table 400 may be rotated so as to extend in a parallel manner to the first horizontal direction X. Afterwards, the first robot arm 210 may move in the first horizontal direction X so as to face the work table 400 so that replacement work may be performed.

More specifically, referring to FIG. 4, the work table 400 may be disposed inside the frame structure 100 while an extension direction of the work target loaded portion 410 on which the bottle B is loaded is parallel to the second horizontal direction Y.

Afterwards, the first robot arm 210 may move in the vertical direction Z so that the first tool 212 may be mounted on the first robot arm 210.

Afterwards, referring to FIG. 5, the work table 400 may be rotated about an axis parallel to the vertical direction such that the direction of extension of the work target loaded portion 410 on which the bottle B is loaded is parallel to the first horizontal direction X. Thus, the work table 400 may at least partially protrude out of the frame structure 100. In this case, the first robot arm 210 may operate in the first horizontal direction X so as to face the work target loaded portion 410.

The first robot unit 1000A may further include the controller 600, a power supply 700, a battery 800, and an industrial computer 900 disposed inside the frame structure 100.

Figure 6:
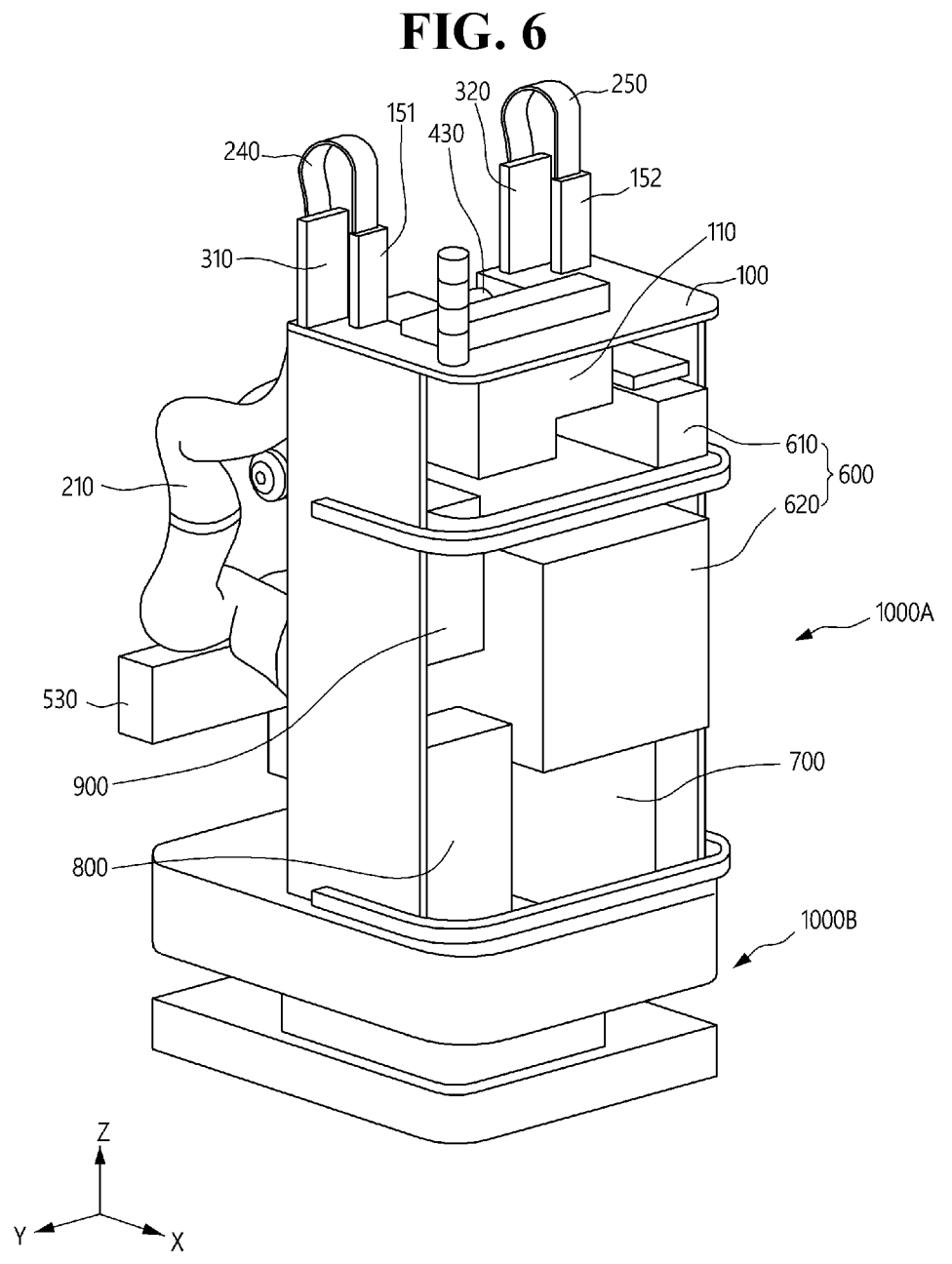

Referring to FIG. 2 and FIG. 6, the controller 600 may control each of the movement of each of the first and second robot arms 210 and 220 and the movement of the work table 400.

The controller 600 may include a movement controller 610 that controls the movement of each of the first vertical moving unit 310, the second vertical moving unit 320, the third vertical moving unit 510, the first horizontal moving unit 520, and the second horizontal moving unit 530, and a robot arm controller 620 that controls the movement of each of the first and second robot arms 210 and 220.

The movement controller 610 may control each of the first and second vertical moving units 310 and 320 to independently move the first and second robot arms 210 and 220 in the vertical direction.

The movement controller 610 may control the third vertical moving unit 510 to move the work table 400 in the vertical direction Z. The movement controller 610 may control each of the first and second horizontal moving units 520 and 530 to move the work table 400 in each of the first and second horizontal directions X and Y.

The movement controller 610 may include a plurality of controllers that respectively control the first vertical moving unit 310, the second vertical moving unit 320, the third vertical moving unit 510, the first horizontal moving unit 520, and the second horizontal moving unit 530.

The power supply 700 and the battery 800 may be used to supply power to the first robot unit 1000A. The industrial computer 900 may provide software necessary for an automated process so that the robot apparatus may be used in an automated production line.

The controller 600 may be configured to process instructions of a computer program by performing operations. For example, the controller 600 may be configured to execute the instructions according to a program stored in a recording device such as memory.

The first robot unit 1000A may further include a first cable structure 240 and a second cable structure 250.

Referring again to FIG. 4 and FIG. 5, the first cable structure 240 may include a first cable 241 for electrically connecting the first robot arm 210 and the controller 600 to each other to drive the first robot arm 210, and a first cable protection portion 242 that protects the first cable 241.

The second cable structure 250 may include a second cable (not shown) for electrically connecting the second robot arm 220 and the controller 600 to each other to drive the second robot arm 220, and a second cable protection portion (not shown) that protects the second cable (not shown).

Referring to FIG. 2, FIG. 4, and FIG. 5, one end of the first cable structure 240 may be supported on a first upper support frame 151 disposed on a top of the frame structure 100, while the other end of the first cable structure 240 may be supported on the first path support frame 161 adjacent to the first robot arm 210.

One end of the second cable structure 250 may be supported on a second upper support frame 152 disposed on the top of the frame structure 100, while the other end of the second cable structure 250 may be supported on a second path support frame (not shown) adjacent to the second robot arm 220.

Although not specifically shown, for example, the first and second cables 241 and 251 may move in a ball screw scheme within the first and second cable protection portions 242 and 252, respectively. In this case, the first cable protection portion 242 may be composed of a plurality of assemblies having a plurality of cables built therein. In another example, the first cable protection portion 242 may be formed integrally so as to surround each of the plurality of cables.

The description regarding the configuration and the connection relationship of the first cable structure 240 may be similarly applied to a configuration and the connection relationship of the second cable structure 250.

The first robot unit 1000A may further include a third cable structure 430 for electrically connecting the work table 400 and the controller 600 to each other to move the work table 400 in the vertical direction Z, and a fourth cable structure 440 and a fifth cable structure (not shown) for moving the work table 400 in the first and second horizontal directions X and Y, respectively.

Referring to FIG. 2 again, the third cable structure 430 may include a third cable (not shown) for electrically connecting the work table 400 and the controller 600 to each other to move the work table 400 in the vertical direction Z. Although not specifically shown, the third cable structure 430 may have a structure in which the third cable is surrounded with a cable protection portion to protect the third cable.

The fourth cable structure 440 may include a fourth cable (not shown) for electrically connecting the work table 400 and the controller 600 to each other to move the work table 400 in the first horizontal direction X. Although not specifically shown, the fourth cable structure 440 may have a structure in which the fourth cable is surrounded with a cable protection portion to protect the fourth cable.

Although not specifically shown, the fifth cable structure may include a fifth cable for electrically connecting the work table 400 and the controller 600 to each other to move the work table 400 in the second horizontal direction Y. Although not specifically shown, the fifth cable structure may have a structure in which the fifth cable is surrounded with a cable protection portion to protect the fifth cable.

The second robot unit 1000B may be disposed under the frame structure 100 so as to drive the first robot unit 1000A. In some implementations, the second robot unit 1000B may be integrated with the first robot unit 1000A.

The robot apparatus 1000 may further include a rotating unit (not shown) for rotating the second robot unit 1000B. Under an operation of the rotating unit (not shown), the second robot unit 1000B may be rotated in a different direction from a direction in which the first robot unit 1000A is rotated, as shown in FIG. 1.

Referring again to FIG. 2, the robot apparatus 1000 may further include an interface connector 1010 connecting the first robot unit 1000A and the second robot unit 1000B to each other. The interface connector 1010 may support the first robot unit 1000A. The interface connector 1010 may include a position adjustment pin 1001 and a cable hole 1002. The first robot unit 1000A may be aligned with and disposed on the second robot unit 1000B via the position adjustment pin 1001. A cable (not shown) for electrically connecting the first robot unit 1000A and the second robot unit 1000B to each other may be inserted into the cable hole 1002.

The positions and numbers of the position adjustment pins 1001 and the cable holes 1002 as shown in FIG. 2 are illustrative and are not limited to those shown.

In another example, the robot apparatus 1000 as described above using FIGS. 1 to 6 may be used for not only the task of replacing the bottle B but also various other tasks.

Although not specifically shown, for example, the first and second tools 212 and 222 of the robot apparatus 1000 may be used to clean an inside of a chamber where a semiconductor process is performed.

Alternatively, the first and second tools 212 and 222 of the robot apparatus 1000 may be used to fasten and disassemble a bolt. In this regard, the bolt is not limited to that used in the semiconductor process.

Alternatively, the robot apparatus 1000 may be used to replace or clean a module disposed on top of the chamber to supply gas used in a plasma process into the chamber in a facility for performing a process using plasma.

Alternatively, the robot apparatus 1000 may be used to replace an edge ring or a focus ring disposed on a side of a support plate to support a wafer in a facility for performing a process using a plasma. Accordingly, the quality of an etching process using a plasma may be improved by more precisely controlling the supply of the plasma to a wafer.

Alternatively, the robot apparatus 1000 may be used to replace a liner that protects the inside of the chamber in the chamber for performing semiconductor processes such as deposition, etching, and cleaning on the wafer.

Using the plurality of robot arms and replaceable tools included in the robot apparatus according to some implementations, different tasks may be performed simultaneously. Furthermore, the work table and the robot arm that may perform the task may move in the first and second horizontal directions X and Y and the vertical direction Z to perform connected operations required to perform the task. Accordingly, the robot apparatus may perform the task conventionally performed by a human worker (for example, a hazardous task dealing with hazardous substances, or a simple task such as fastening bolts, etc.) and thus may smoothly perform the task in an automated fashion.

Figure 7:
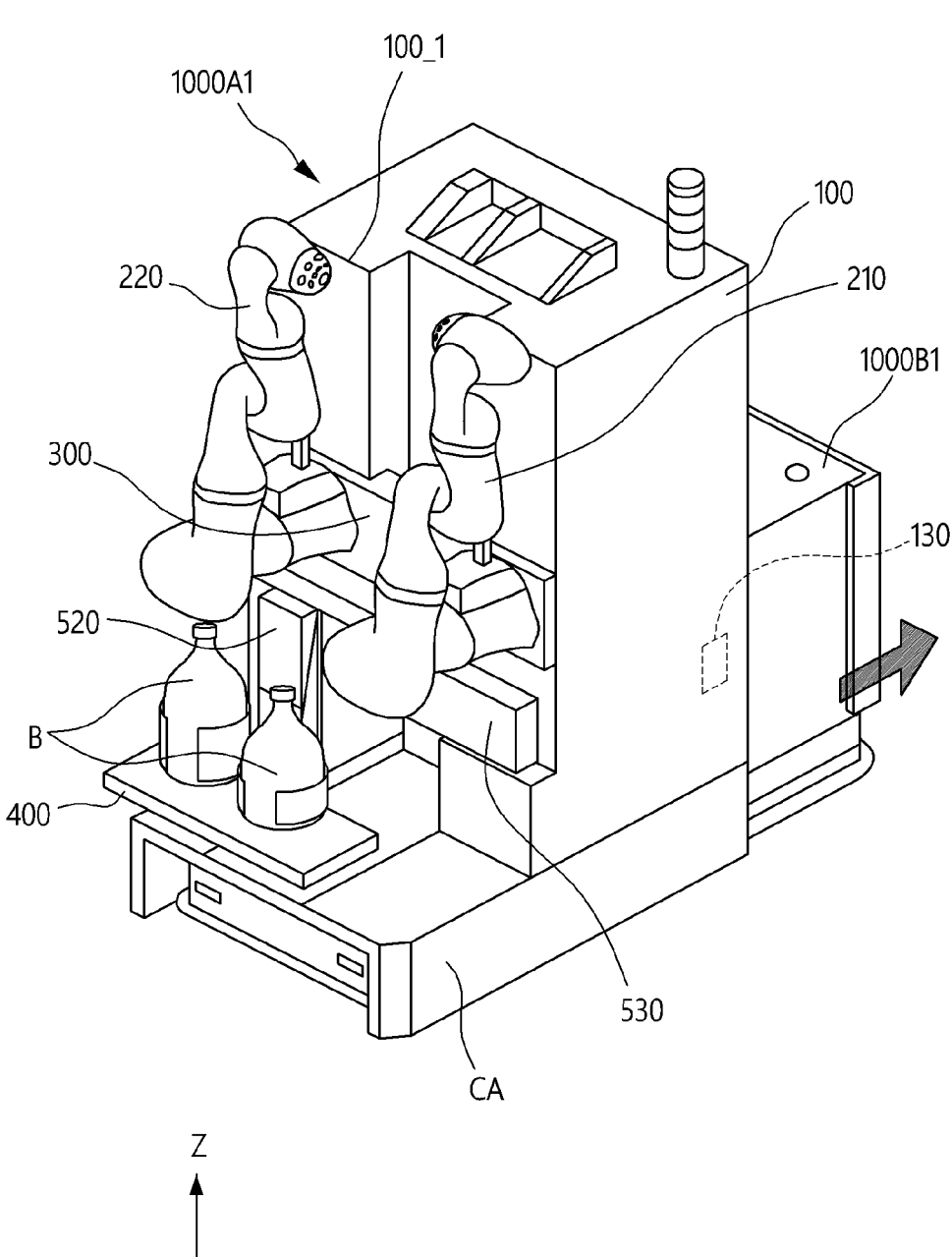
FIG. 7 is an example diagram for illustrating a robot apparatus.

FIG. 7 is an example diagram for illustrating a robot apparatus. For convenience of description, the description of contents that are the same as those as described using FIGS. 1 to 6 may be omitted.

Referring to FIG. 7, a second robot unit 1000B1 may be separated from a first robot unit 1000A1. In this case, the first robot unit 1000A1 may be disposed on a cart CA and may be moved by the second robot unit 1000B1.

A robot arm moving module 300 for moving the first and second robot arms 210 and 220 in the vertical direction Z may have an integrated structure. That is, unlike the first robot unit 1000A in FIGS. 1 to 6, the first and second robot arms 210 and 220 may be raised and lowered in an integral manner under the operation of the robot arm moving module 300.

The first horizontal moving unit 520 configured to move the work table 400 in the first horizontal direction X may be disposed closer, in the first horizontal direction X, to the work table 400 than the second horizontal moving unit 530 configured to move the work table 400 in the second horizontal direction Y may be. That is, the second horizontal moving unit 530 may be disposed closer to the first surface 100_1 of the frame structure 100 than the first horizontal moving unit 520 may be.

The ventilation unit 130 may be adjacent to a surface opposite to the first surface 100_1 of the frame structure 100 where the first and second robot arms 210 and 220 are disposed.

Hereinafter, with reference to FIGS. 8 to 28, example operations of the robot apparatus are described.

FIGS. 8 to 28 are drawings for illustrating the example operations of the robot apparatus. For convenience of description, the description of contents that are the same as those as described using FIGS. 1 to 7 may be omitted.

Figure 8:
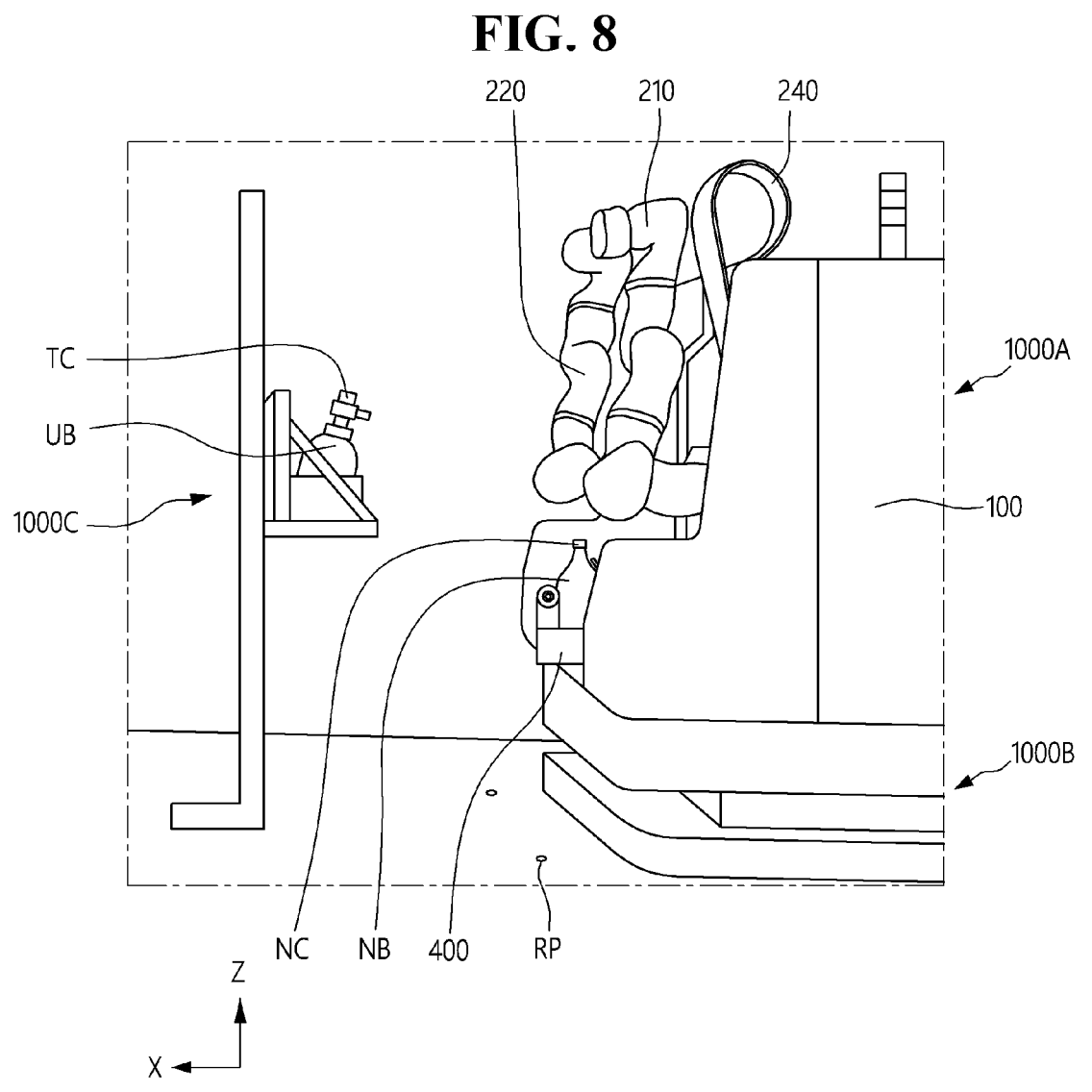

Referring to FIG. 8, the robot apparatus including the first and second robot units 1000A and 1000B approaches the cabinet 1000C. A used bottle UB to be replaced may be loaded in the cabinet 1000C. A tube cap TC may be attached to the used bottle UB. A new bottle NB with a normal cap NC attached thereto may be loaded on the work table 400. The first and second robot units 1000A and 1000B may perform the task of replacing the used bottle UB with the new bottle NB and collecting the used bottle UB.

Under the operation of the second robot unit 1000B, the first robot unit 1000A may be moved along the first horizontal direction X from a home position (not shown) to a reference position RP. In some implementations, the reference location RP may refer to a location on a bottom surface of the work space where the replacement work is performed.

Figure 9:
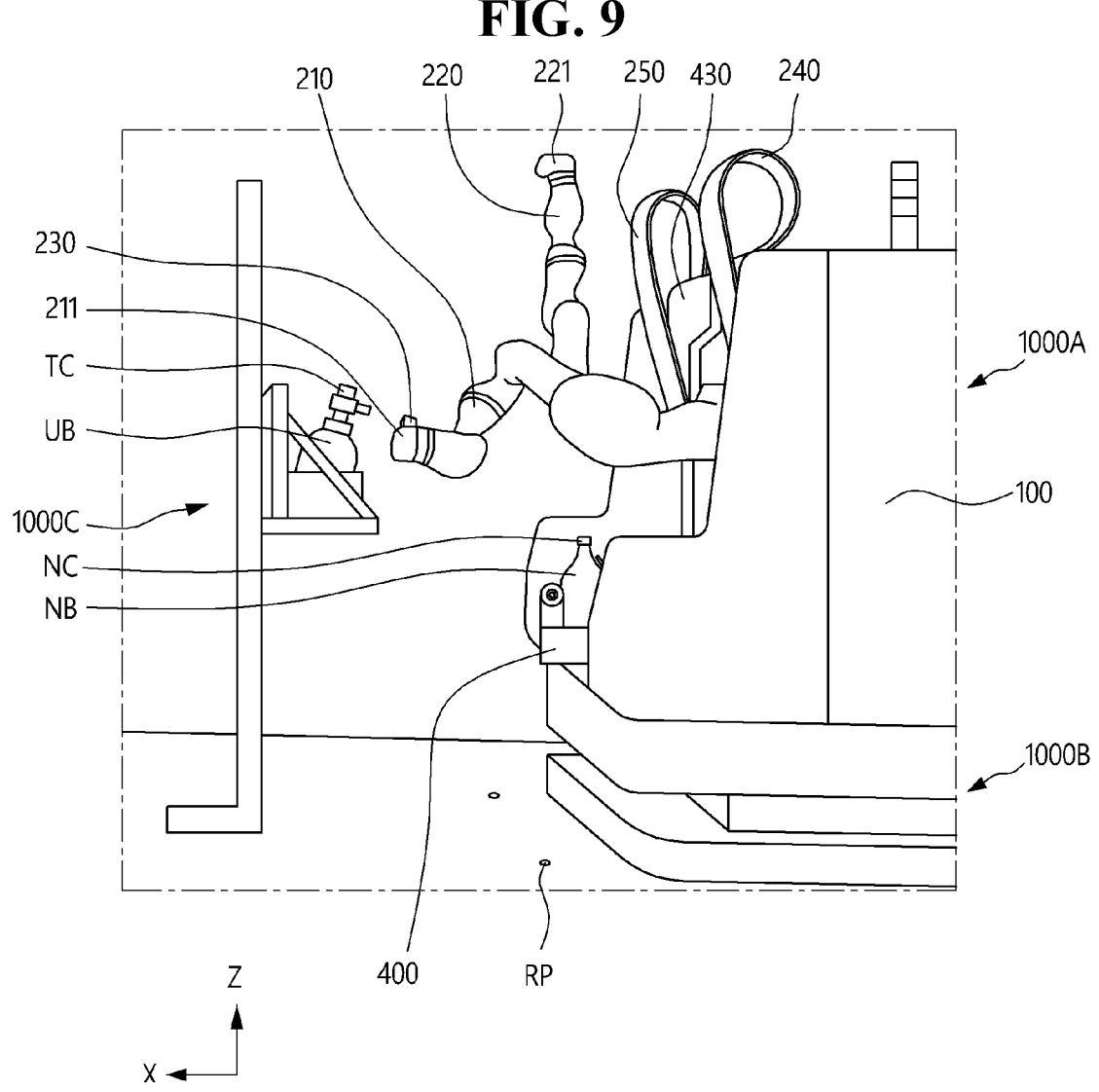
Figure 10:
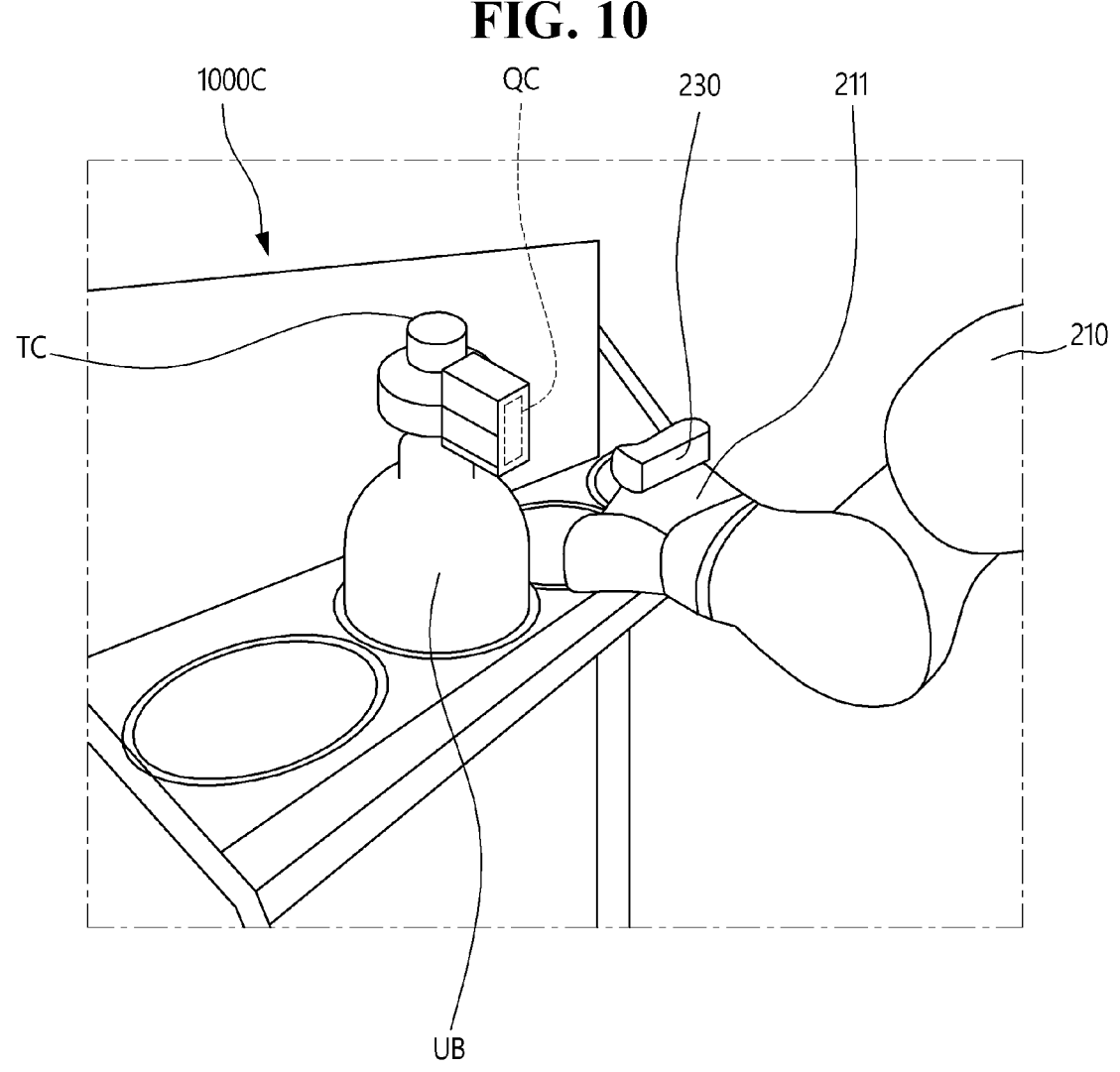

Referring to FIG. 9 and FIG. 10, a camera 230 may be disposed on the first tool replacement portion 211. The first robot arm 210 may move in the first horizontal direction X under the movement of the first vertical moving unit (310 in FIG. 2). Accordingly, the camera 230 may be positioned adjacent to the cabinet 1000C. The camera 230 may recognize a QR code QC of the used bottle UB and thus may measure a location of the used bottle UB.

Figure 11:
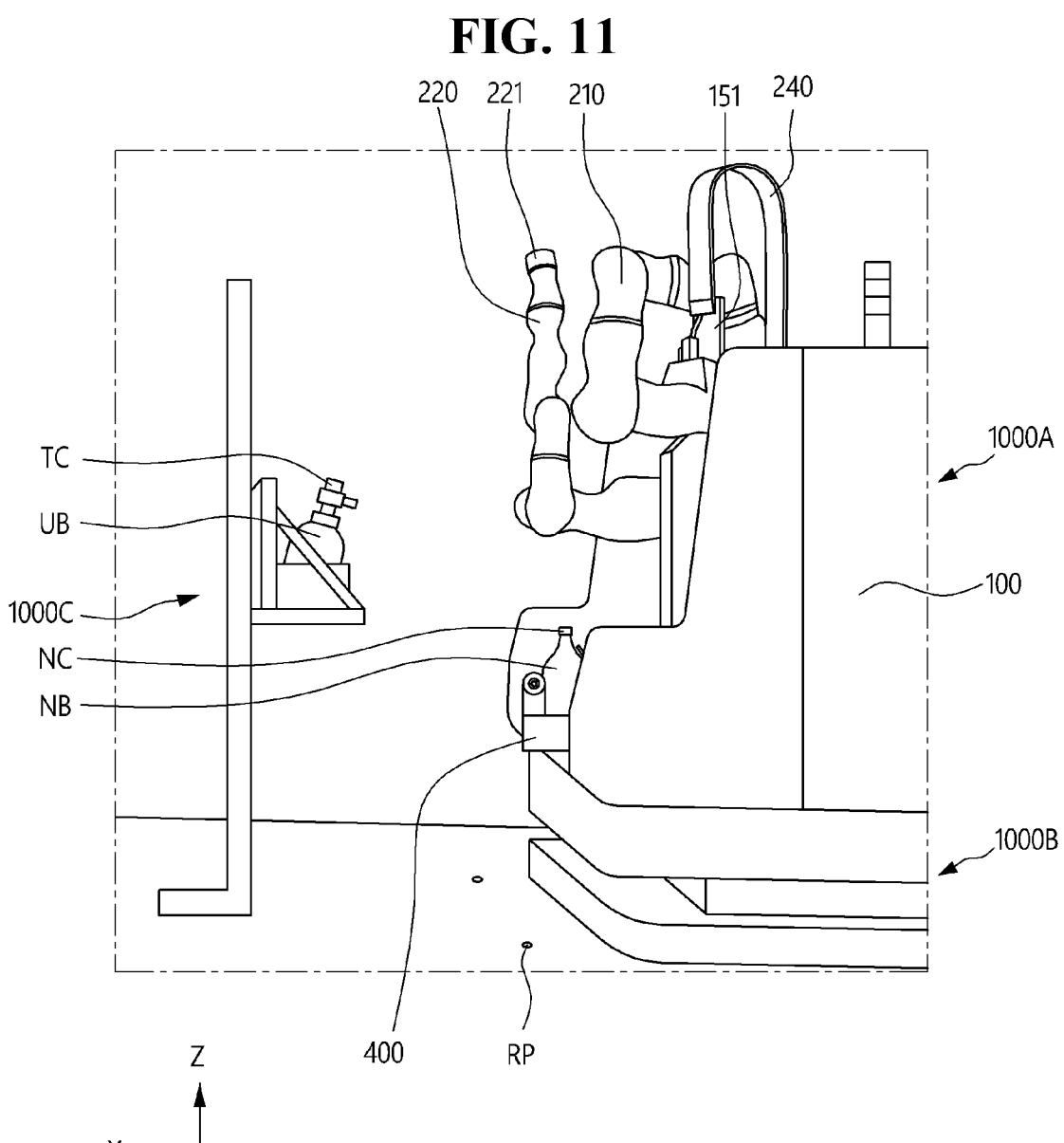
Figure 12:
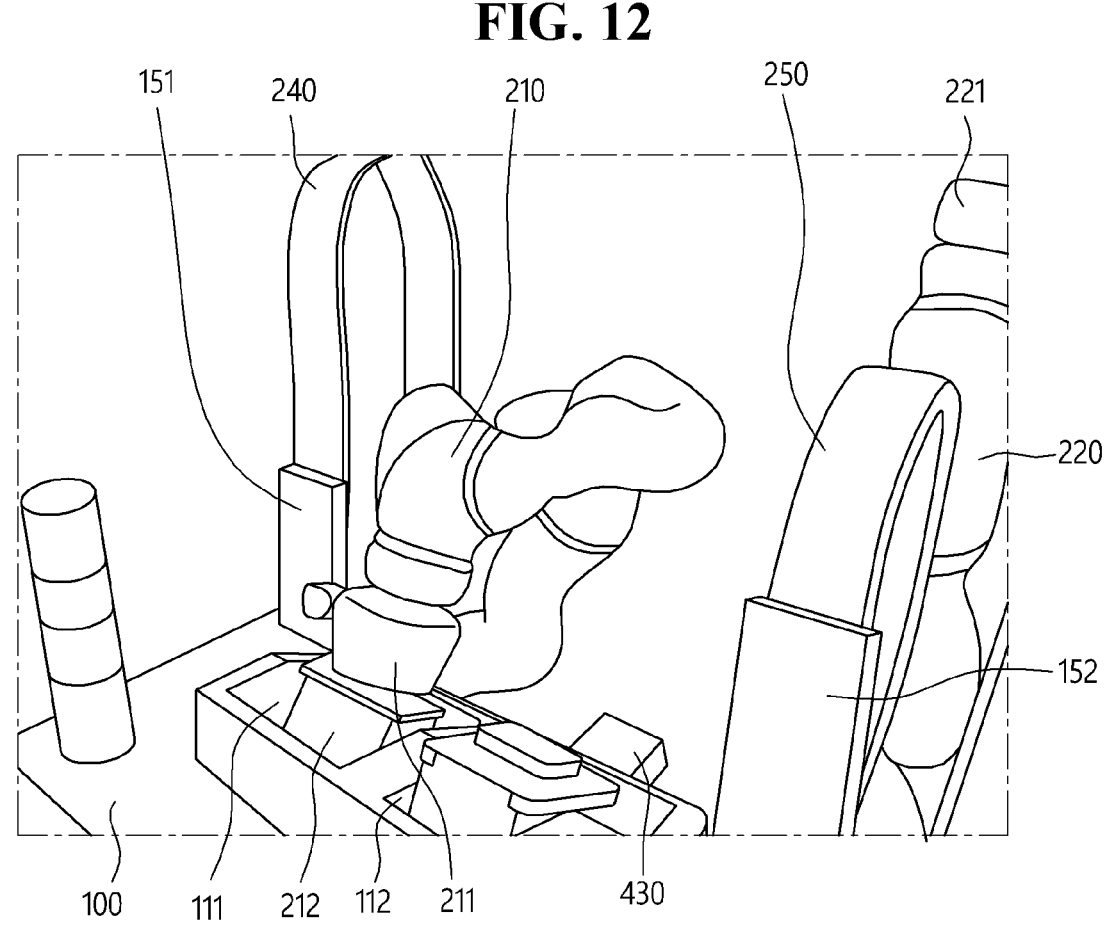

Referring to FIG. 11 and FIG. 12, the first robot arm 210 may be lifted up in the vertical direction Z toward the first tool storage 111 where the first tool 212 is stored. Afterwards, the first tool 212 may be taken out from the first tool storage 111 and may be mounted on the first tool replacement portion 211. In some implementations, the first tool 212 may refer to a gripper for holding the used bottle UB. Afterwards, the first robot arm 210 equipped with the first tool 212 may be lowered in the vertical direction Z.

Figure 13:
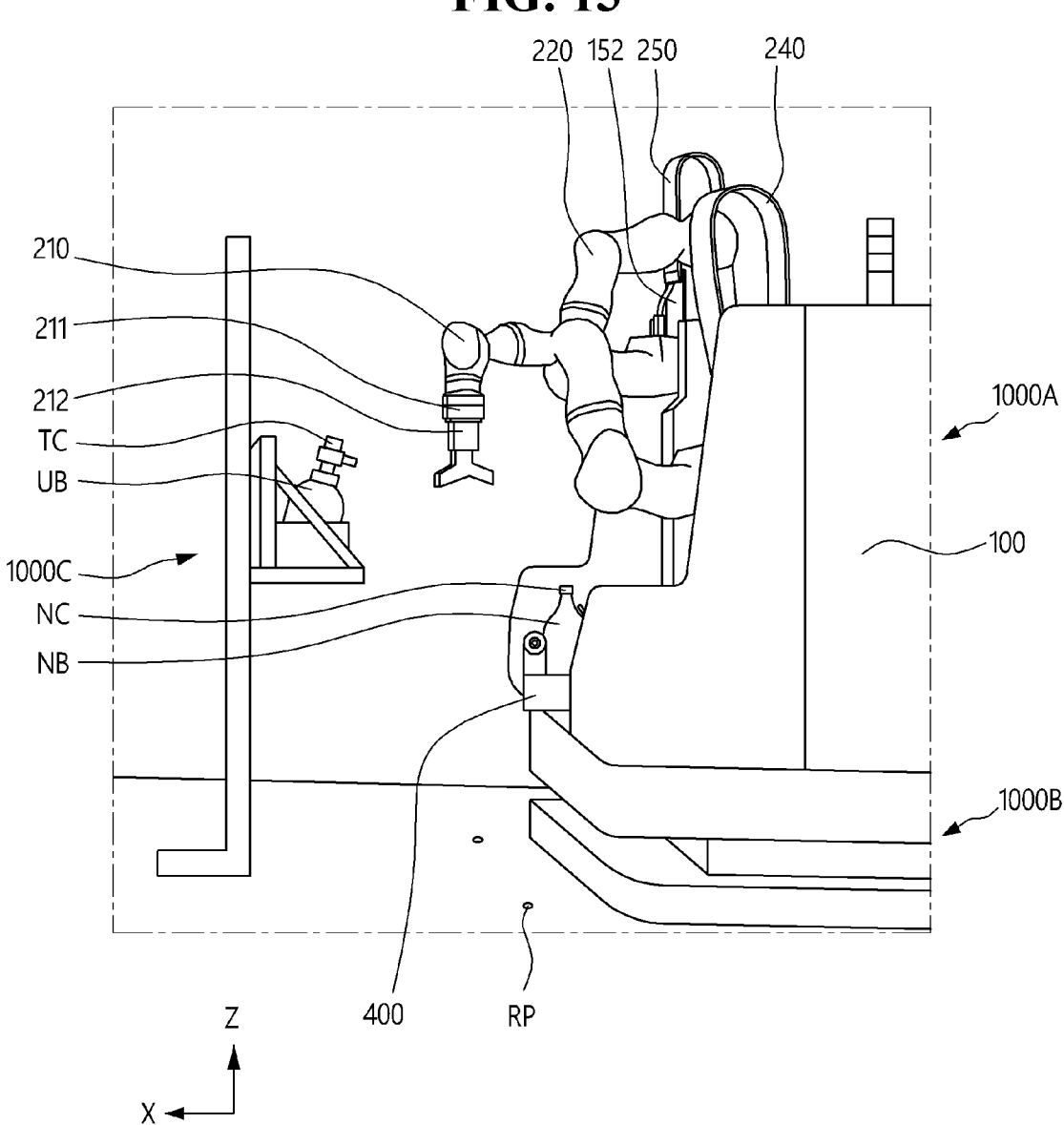
Figure 14:
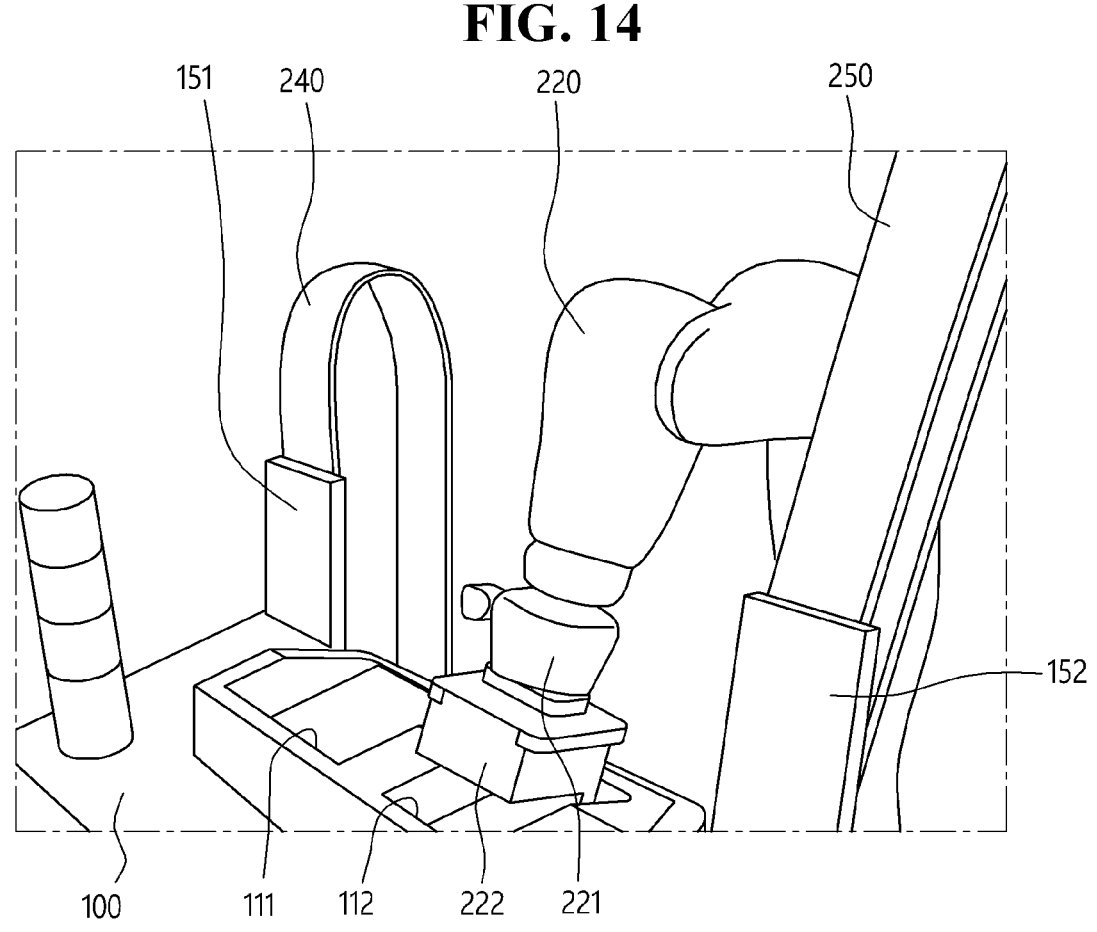

Referring to FIG. 13 and FIG. 14, at the same time as when the first robot arm 210 descends, the second robot arm 220 may move up in the vertical direction Z toward the second tool storage 112 where the second tool 222 is stored. Afterwards, the second tool 222 may be taken out from the second tool storage 112 and may be mounted on the second tool replacement portion 221. The second tool 222 may refer to a gripper for opening the cap of the new bottle NB. Afterwards, the second robot arm 220 equipped with the second tool 222 may be lowered in the vertical direction Z.

The work table 400 on which the new bottle NB is loaded may be disposed inside the frame structure 100 while the extension direction of the work table 400 parallel to the second horizontal direction Y.

Figure 15:
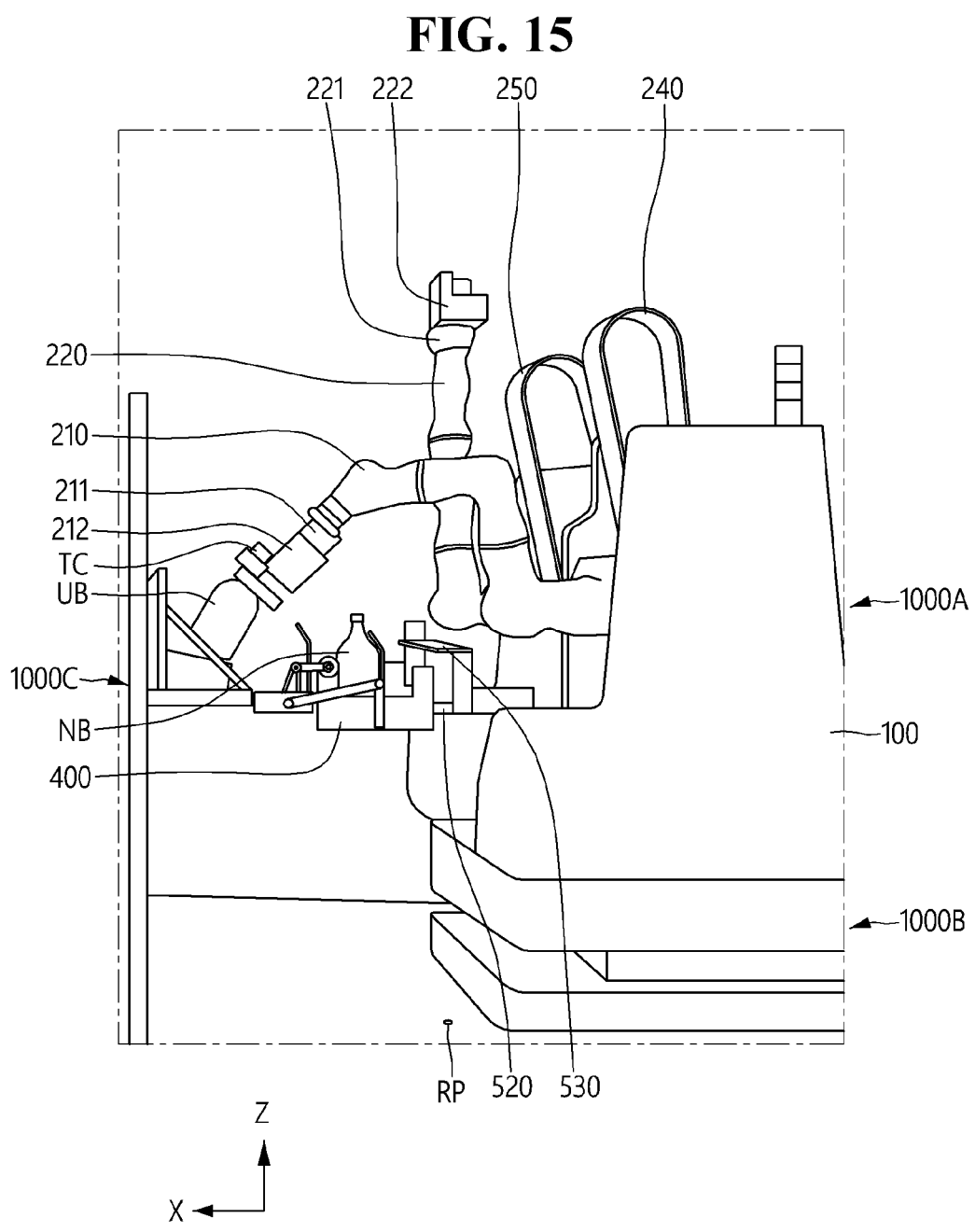

Referring to FIGS. 15 and 16, the work table 400 may be rotated such that the direction of extension of the work table 400 on which the new bottle NB is loaded is parallel to the first horizontal direction X, so that at least a portion of the work table 400 may protrude out of the frame structure 100. In this case, the first robot arm 210 may move in the first horizontal direction X to face the work table 400. Accordingly, the work table 400 and the cabinet 1000C may be disposed adjacent to each other in the first horizontal direction X.

The first tool 212 may grip the used bottle UB and move the used bottle UB from the cabinet 1000C to the work table 400.

Referring to FIG. 17, the first tool 212 may include the first-first finger 2121 that may grip the used bottle UB. For example, the first tool 212 may stably grip the used bottle UB using the first-second finger 2122 extending through a ring portion of the used bottle B, thereby prevent the used bottle from falling down.

Figure 18:
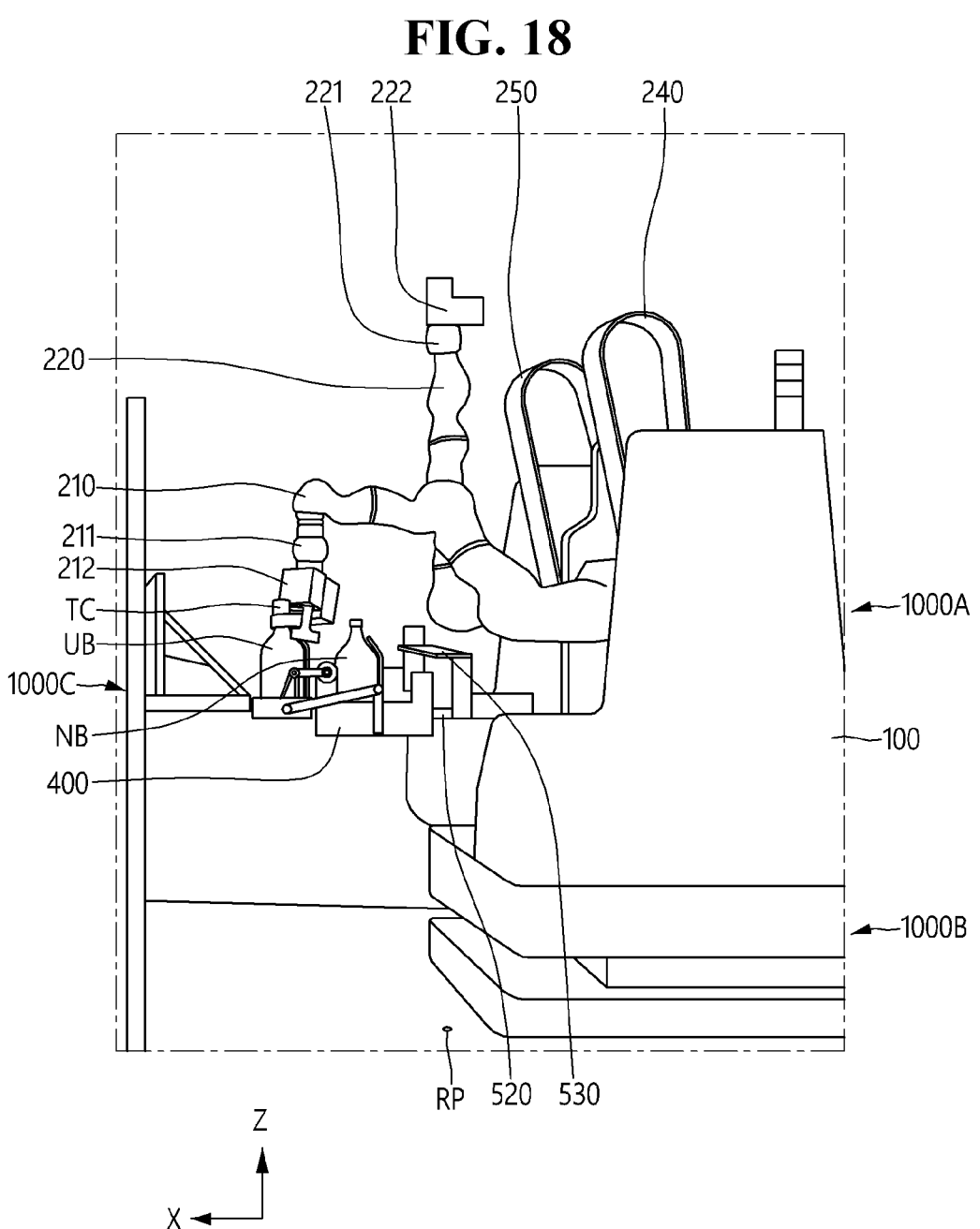
Figure 19:
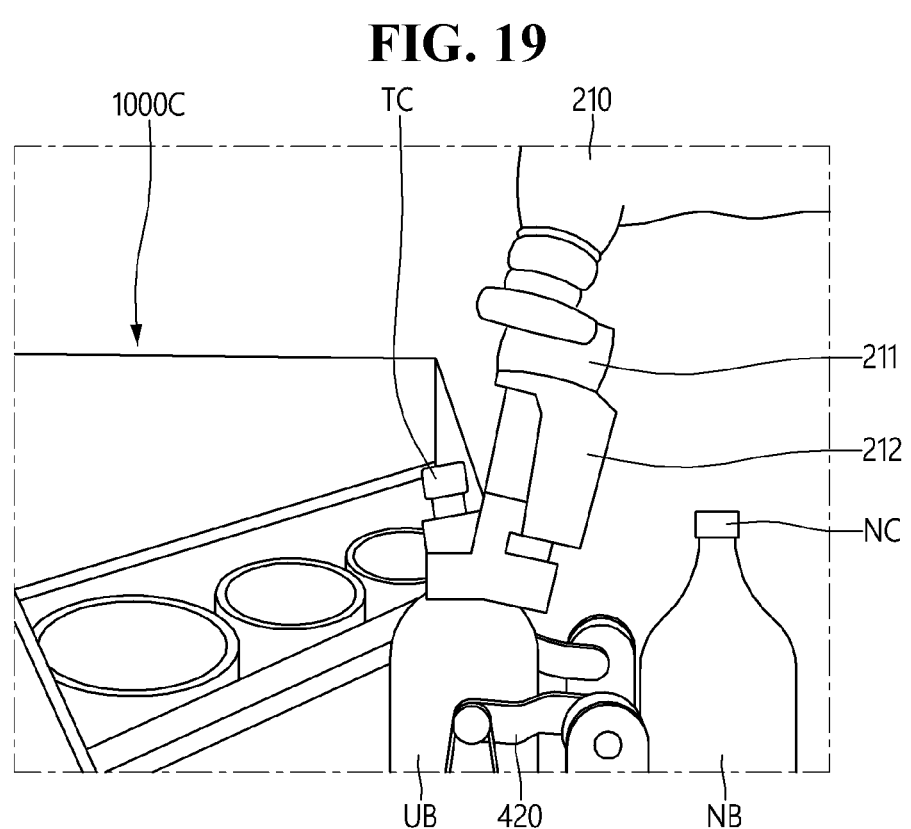

Referring to FIGS. 18 and 19, the first robot arm 210 places the used bottle UB from the cabinet 1000C onto the work table 400. In this regard, the fixing unit 420 to prevent the used bottle UB from rotating and falling off may be in close contact with the used bottle UB.

Figure 20:
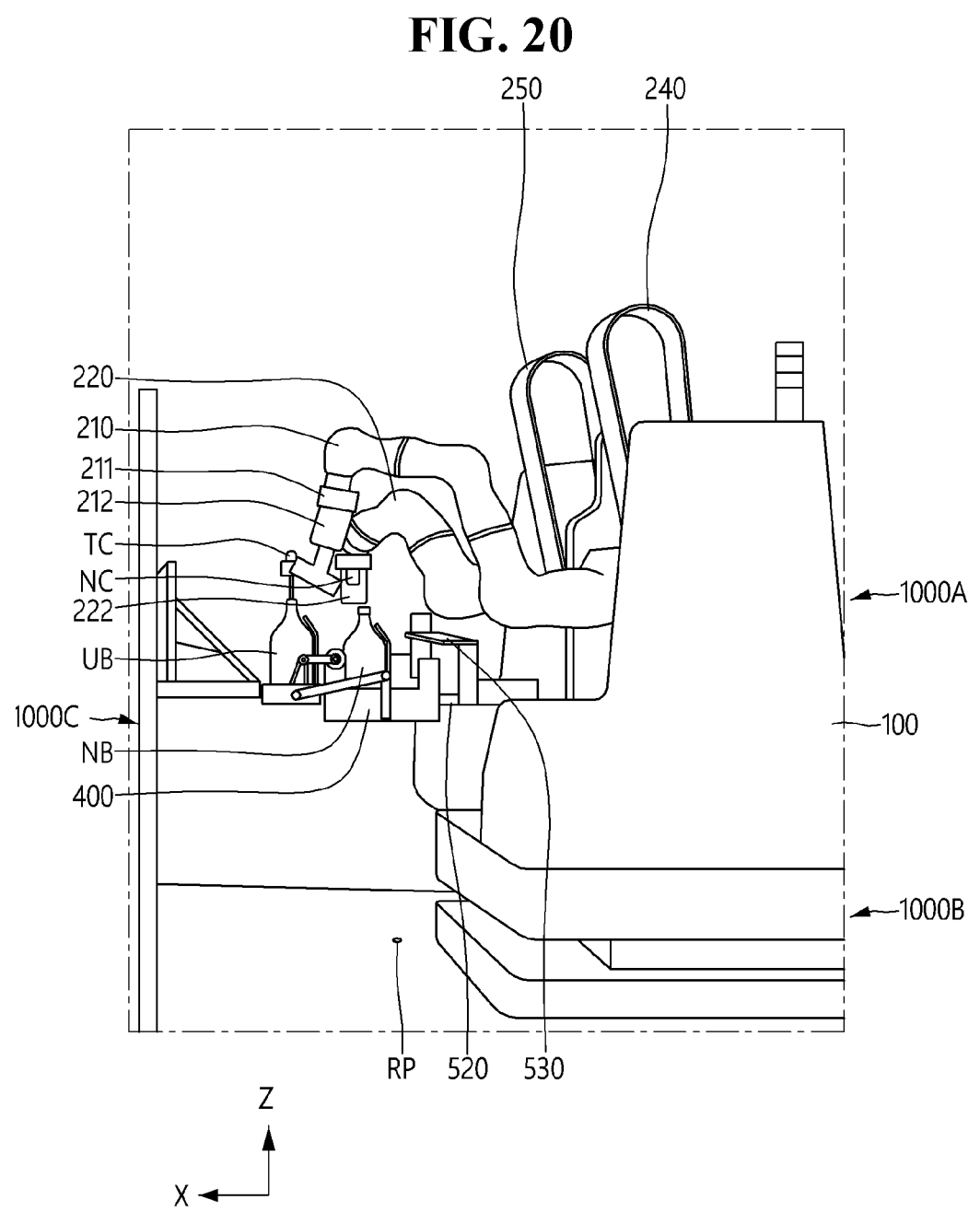
Figure 21:
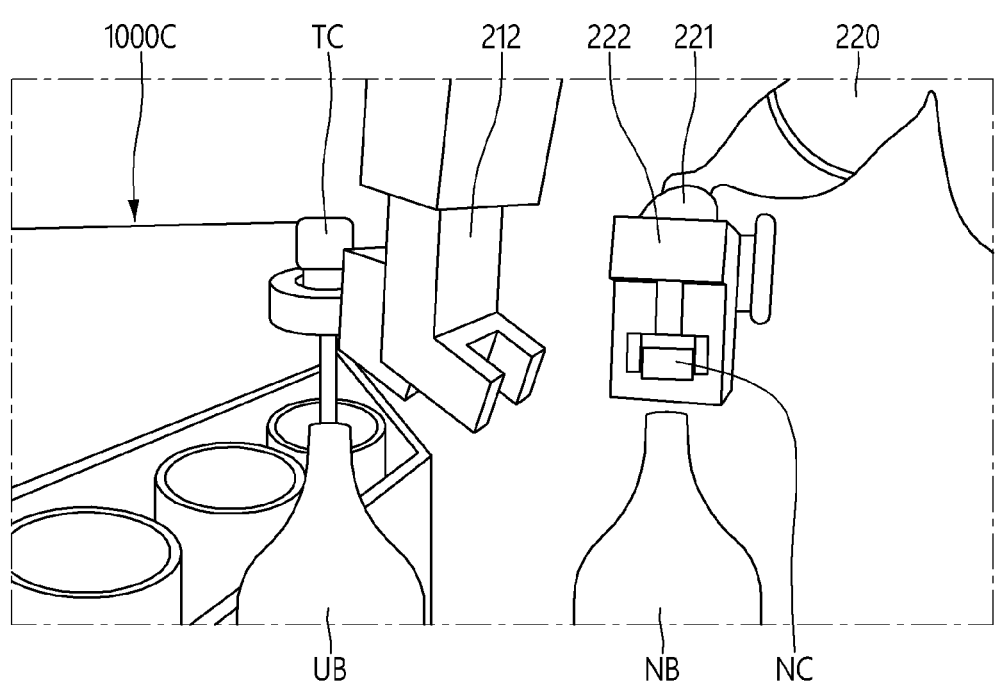

Referring to FIG. 20 and FIG. 21, the first tool 212 may be lifted in the vertical direction Z and may separate the tube cap TC from the used bottle UB. The second tool 222 may be positioned to face the new bottle NB and may separate the normal cap NC from the new bottle NB.

Figure 22:
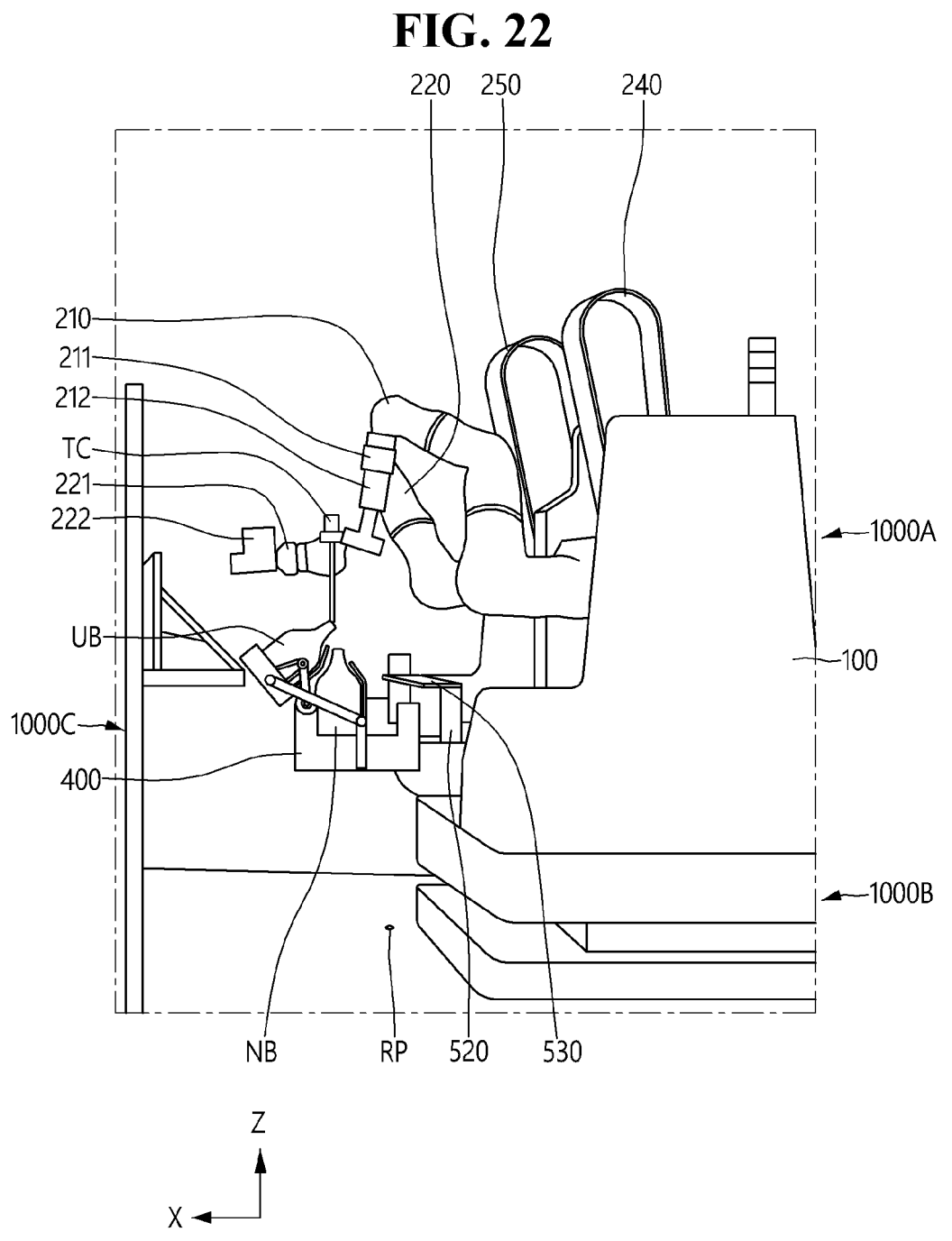
Figure 23:
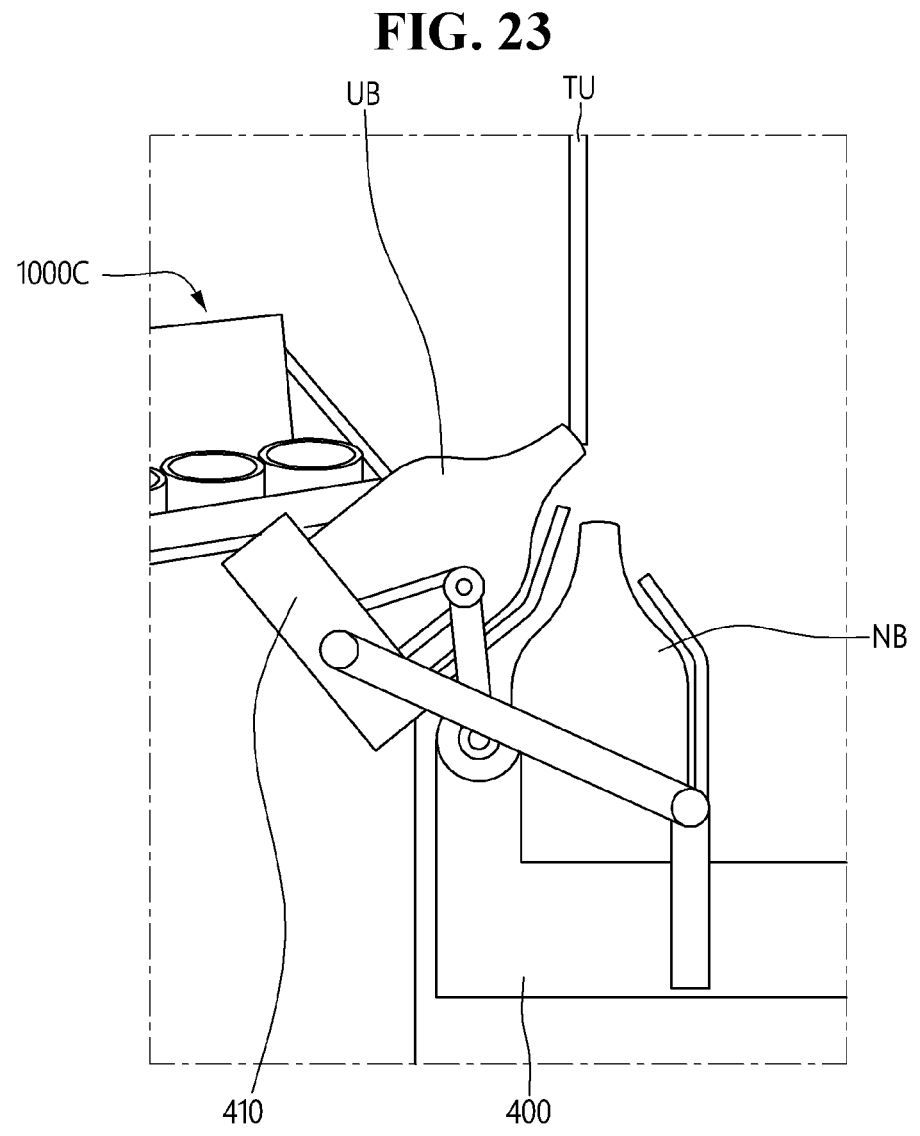

Referring to FIG. 22 and FIG. 23, the first robot arm 210 may move upwards in the vertical direction Z. Thus, a work space used to move the tube cap TC from the used bottle UB to the new bottle NB may be secured.

Afterwards, the tube cap TC to which a tube TU is connected may be moved to the new bottle NB by tilting the used bottle UB using an auxiliary driving device (not shown) attached to the work table 400. For example, the auxiliary driving device may mean a motor that provides power to tilt the work target loaded portion 410 on which the used bottle UB is loaded. The (e.g., PR) chemicals may be transferred to the new bottle NB while the used bottle UB has been tilted relative to the tube cap TC, such that leakage of the PR chemicals may be prevented as much as possible.

Figure 24:
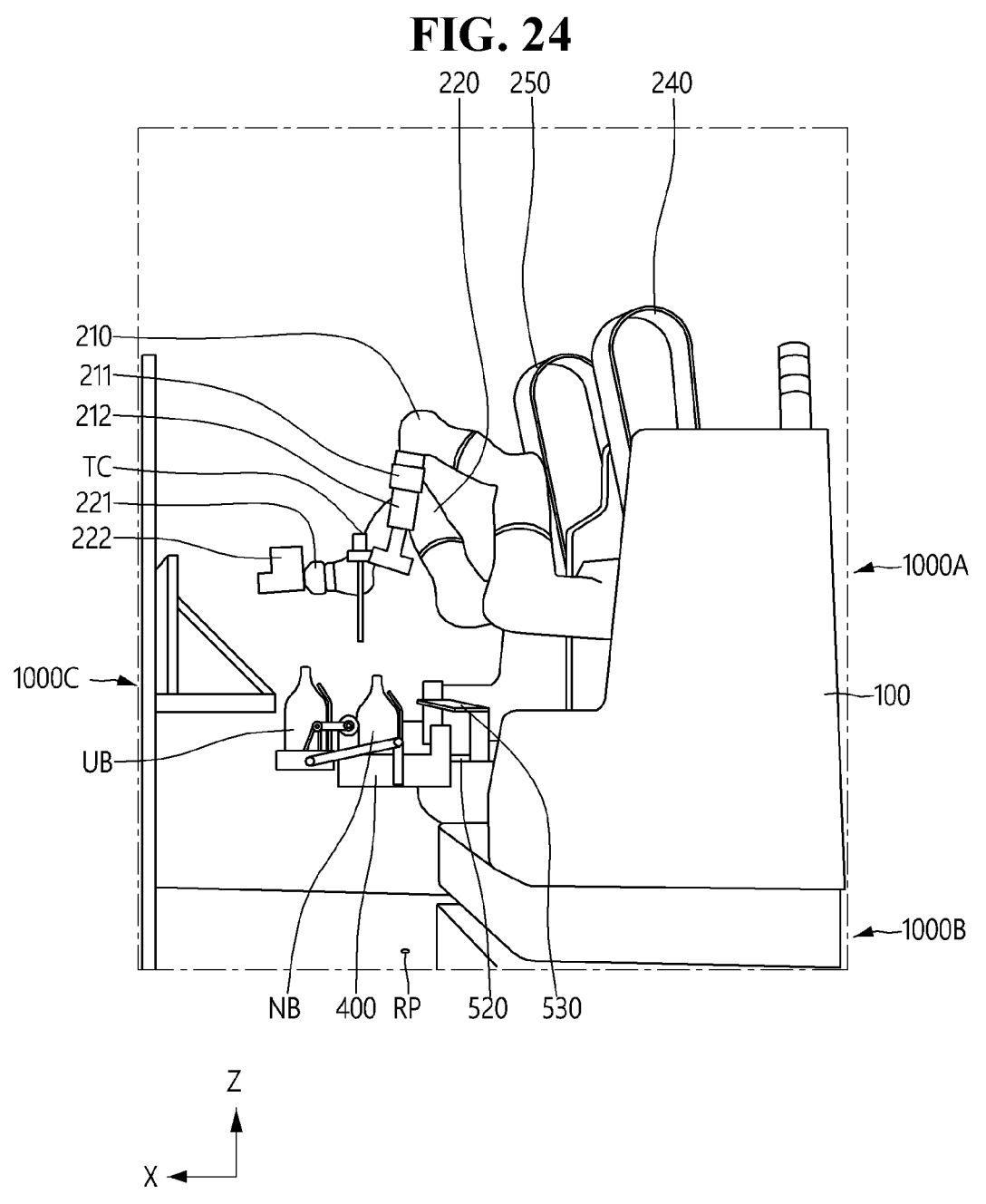
Figure 25:
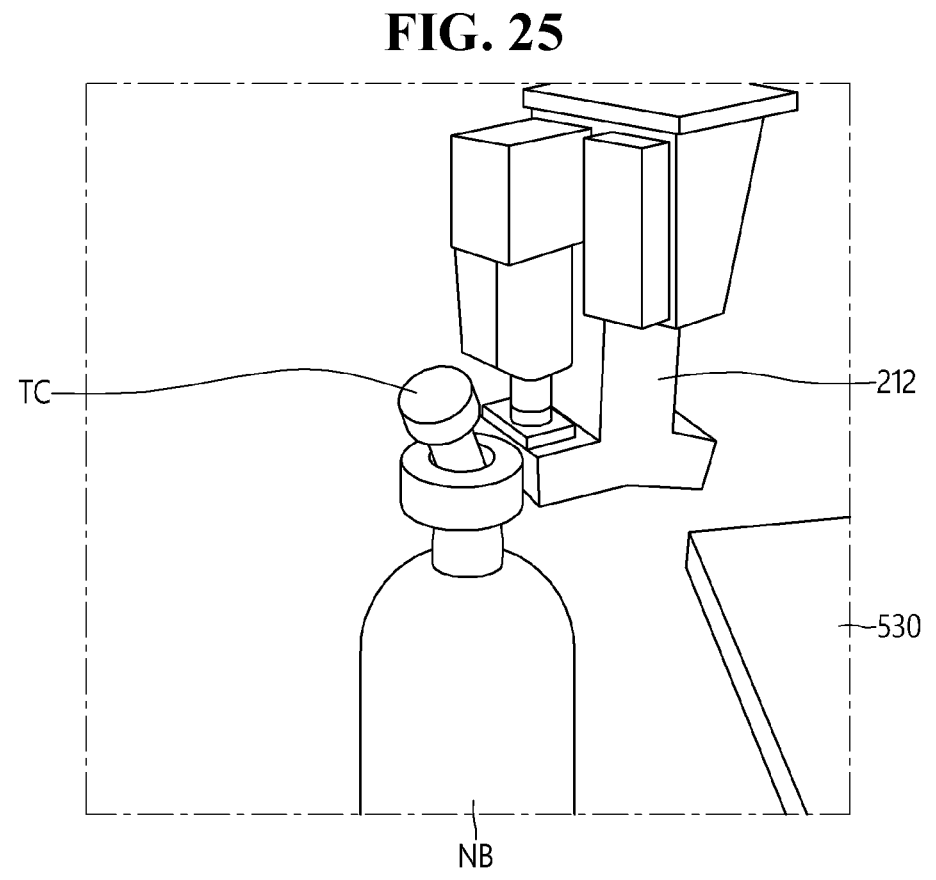

Referring to FIG. 24 and FIG. 25, the tube cap TC may be moved from the used bottle UB to the new bottle NB, so that the tube cap TC may be disposed on the new bottle NB.

Afterwards, the first robot arm 210 to which the first tool 212 is attached may move down. The tube cap TC may be fastened to the new bottle NB using the first tool 212. Although not specifically shown, the normal cap NC may be fastened to the used bottle UB using the second tool 222.

Figure 26:
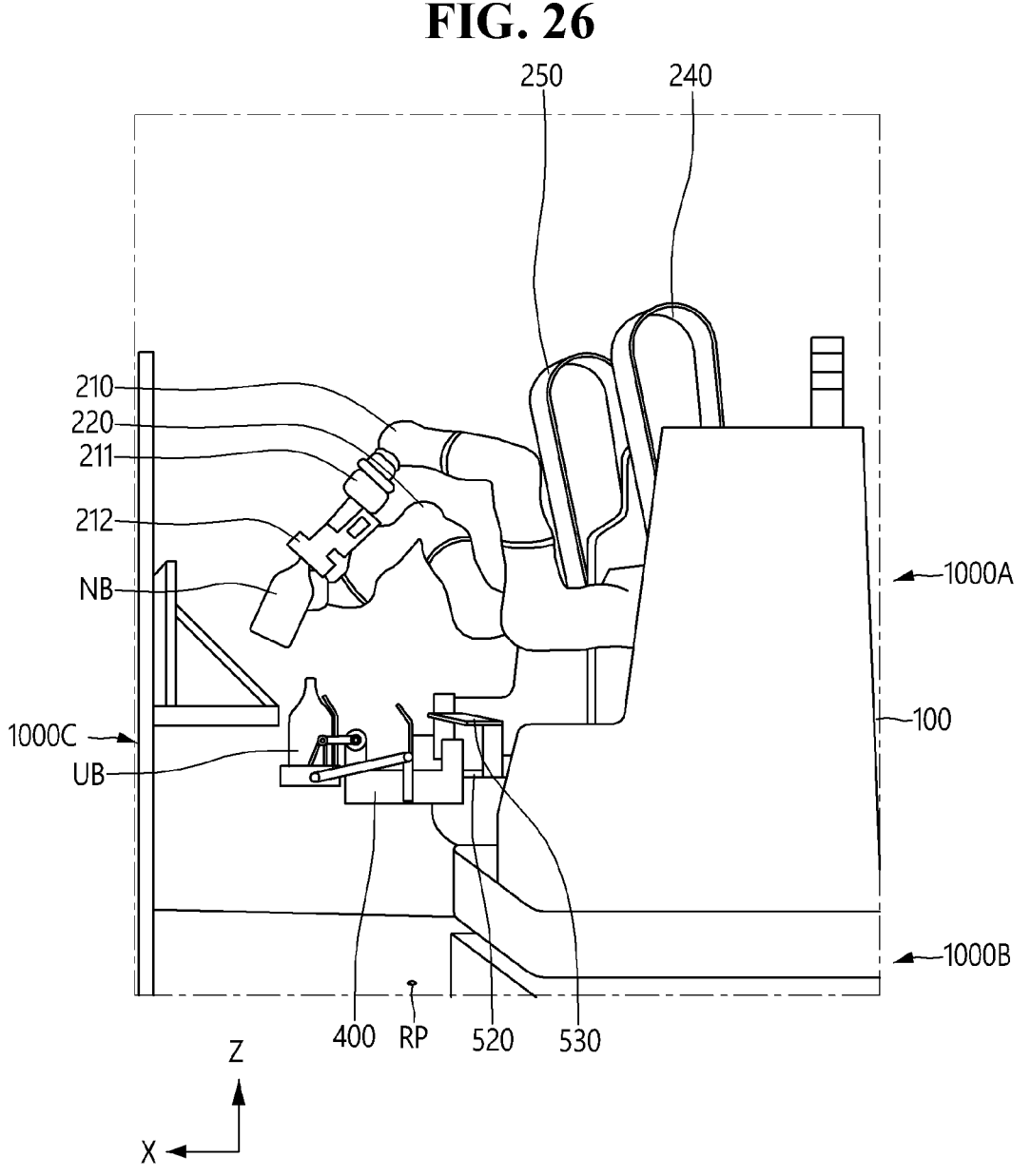
Figure 27:
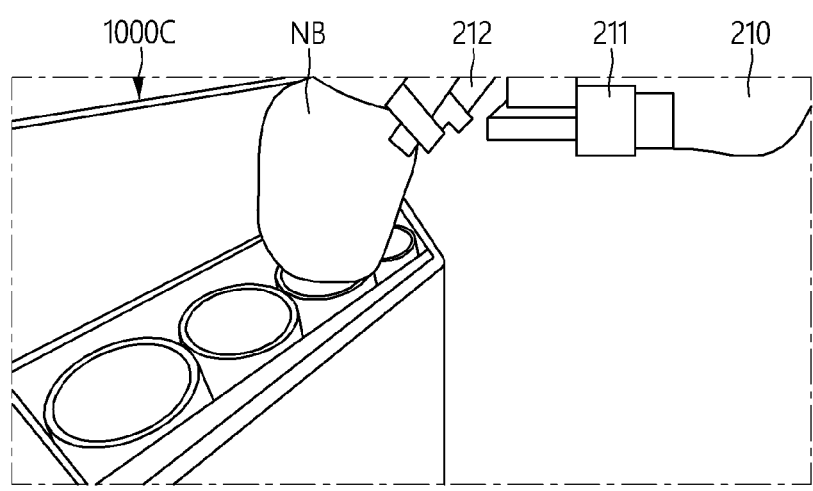

Referring to FIG. 26 and FIG. 27, the first tool 212 gripping the new bottle NB and the work table 400 may be moved away from each other in the vertical direction Z. Next, the first robot arm 210 to which the first tool 212 is attached may move in the first horizontal direction X and may place the new bottle NB in the cabinet 1000C.

Although not specifically shown, the used bottle UB may be disposed in the work table 400 by the second tool 222 while the normal cap NC has been fastened thereto.

Figure 28:
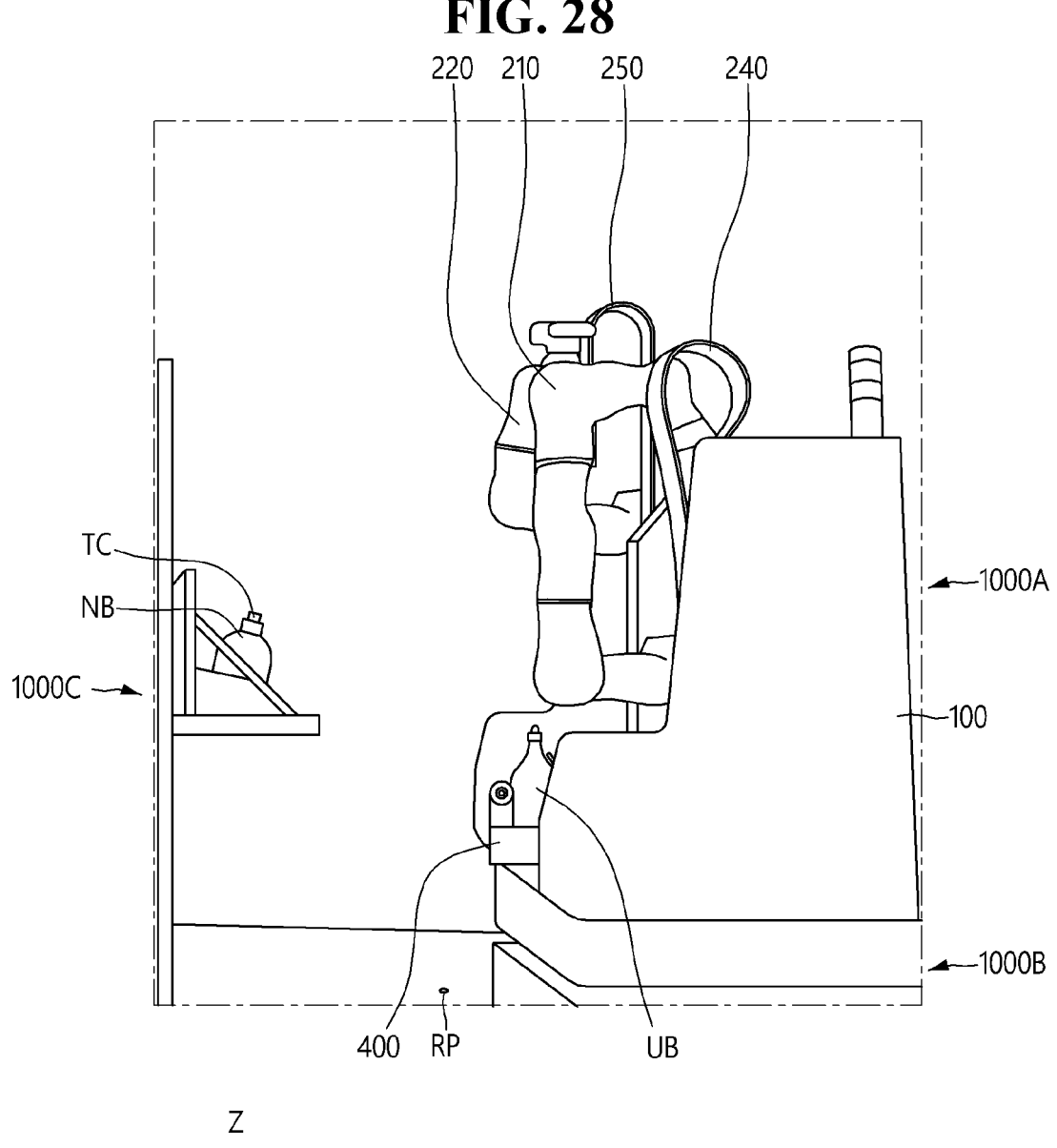

Referring to FIG. 28, the work table 400 may be rotated again so that the extension direction of the work target loaded portion 410 on which the used bottle UB is loaded is parallel to the second horizontal direction Y and thus may be positioned inside the frame structure 100.

The first and second tools 212 and 222 may be moved to the first and second tool storages 111 and 112, respectively. The first tool 212 may be removed from the first robot arm 210. The second tool 222 may be removed from the second robot arm 220.

Afterwards, the replacement task is completed. The first robot unit 1000A moves from the reference position RP to the home position (not shown) under the operation of the second robot unit 1000B.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

Although implementations of the present disclosure have been described with reference to the accompanying drawings, the present disclosure is not limited to the above implementations, but may be implemented in various different forms. A person skilled in the art may appreciate that the present disclosure may be practiced in other concrete forms without changing the technical spirit or essential characteristics of the present disclosure. Therefore, it should be appreciated that the implementations as described above are not restrictive but illustrative in all respects.

What is claimed is:

1. A robot apparatus comprising:
a first robot unit supported by a frame structure; and
a second robot unit disposed under the frame structure and configured to move the first robot unit,
wherein the first robot unit includes:
first and second robot arms including, at first ends thereof, first and second tool replacement portions, respectively, wherein first and second tools configured to perform a task are mounted on the first and second tool replacement portions, respectively;
a robot arm moving module configured to move each of the first and second robot arms in a vertical direction;
a work table on which a work target subjected to the task is loaded;
a work table moving module configured to move the work table in each of the vertical direction, a first horizontal direction, and a second horizontal direction orthogonal to the first horizontal direction; and
a controller disposed inside the frame structure and configured to control movement of each of the first and second robot arms and also movement of the work table.

2. The robot apparatus of claim 1, wherein the frame structure includes:
first and second tool storages for loading the first and second tools therein, respectively;
one or more sensors disposed on a first side of the frame structure and on a second side of the frame structure opposite the first side so as to detect a sensing target within a work area;
a ventilation unit disposed on the first side of the frame structure so as to ventilate an inside of the first robot unit; and an exhaust unit disposed adjacent to the work table so as to discharge a harmful substance generated during the task.

3. The robot apparatus of claim 1, wherein each of the first and second robot arms includes a plurality of articulations, and a plurality of motors for driving the plurality of articulations.

4. The robot apparatus of claim 1, wherein the first and second tools are removably mounted on the first and second robot arms, respectively, wherein each of the first and second tools includes a finger capable of performing the task, and a motor for driving the finger.

5. The robot apparatus of claim 1, wherein the work table includes a work target loaded portion for loading the work target thereon, and a fixing unit for fixing the work target.

6. The robot apparatus of claim 1, wherein the robot arm moving module includes:

a first vertical moving unit disposed at a second end of the first robot arm and configured to move the first robot arm in the vertical direction; and a second vertical moving unit disposed at a second end of the second robot arm and configured to move the second robot arm in the vertical direction.

7. The robot apparatus of claim 6, wherein the work table moving module includes:

a third vertical moving unit configured to move the work table in the vertical direction; and first and second horizontal moving units configured to move the work table in the first and second horizontal directions, respectively.

8. The robot apparatus of claim 7, wherein the first horizontal moving unit is disposed closer to the first and second vertical moving units than is the second horizontal moving unit.

9. The robot apparatus of claim 7, wherein the second horizontal moving unit is disposed closer to the first and second vertical moving units than is the first horizontal moving unit.

10. The robot apparatus of claim 1, wherein the first robot unit further includes:

a first cable structure for electrically connecting the first robot arm with the controller; and a second cable structure for electrically connecting the second robot arm with the controller.

11. The robot apparatus of claim 10, wherein a first end of the first cable structure is supported on a first upper support frame disposed on a top of the frame structure, wherein a second end of the first cable structure is supported on a first path support frame adjacent to the first robot arm, wherein a first end of the second cable structure is supported on a second upper support frame disposed on the top of the frame structure, wherein a second end of the second cable structure is supported on a second path support frame adjacent to the second robot arm.

12. The robot apparatus of claim 1, wherein the first robot unit further includes a third cable structure for electrically connecting the work table with the controller.

13. The robot apparatus of claim 1, wherein the second robot unit is configured to be removed from the first robot unit.

14. The robot apparatus of claim 1, further comprising:

a rotating unit for rotating the second robot unit; and an interface connector for connecting the first robot unit with the second robot unit.

15. A robot system comprising:

a cabinet in which a replacement target is loaded; and a robot apparatus configured to perform a replacement task, wherein the robot apparatus includes:

first and second robot arms having first and second grippers to perform the replacement task mounted thereon, respectively;

a work table on which the replacement task is performed;

a moving module configured to move each of the first and second robot arms and the work table; and a controller configured to control the moving module, wherein the moving module includes:

first and second vertical moving units configured to respectively move the first and second robot arms in a vertical direction;

a third vertical moving unit configured to move the work table in the vertical direction; and first and second horizontal moving units configured to move the work table in a first horizontal direction and in a second horizontal direction orthogonal to the first horizontal direction, respectively, wherein the controller is configured to:

move the first robot arm in the vertical direction so that the first gripper is mounted on the first robot arm;

rotate the work table such that an extension direction of the work table is parallel to the first horizontal direction; and move the first robot arm in the first horizontal direction to perform the replacement task.

16. The robot system of claim 15, wherein the first and second robot arms move in the vertical direction from a bottom of the cabinet to a vertical level of the cabinet at which the replacement task is performed.

17. The robot system of claim 15, wherein the robot apparatus is supported by a frame structure, wherein the work table moves in the first horizontal direction while being positioned inside and outside the frame structure, wherein the work table moves in the second horizontal direction while being disposed inside the frame structure.

18. The robot system of claim 15, wherein the controller is configured to:

control each of the first and second vertical moving units so that the first and second robot arms move independently in the vertical direction; and control the third vertical moving unit so that the work table moves in the vertical direction, control each of the first and second horizontal moving units so that the work table moves in each of the first and second horizontal directions.

19. The robot system of claim 15, wherein the robot apparatus further includes:

a first cable structure for electrically connecting the first robot arm with the controller to drive the first robot arm; and a second cable structure for electrically connecting the second robot arm with the controller to drive the second robot arm.

20. A robot apparatus comprising:

a first robot unit supported by a frame structure; and a second robot unit disposed under the frame structure and configured to move the first robot unit, wherein the first robot unit includes:

17 first and second robot arms disposed on a first surface of the frame structure, wherein each of the first and second robot arms includes a plurality of rotatable articulations;

first and second tool replacement portions disposed at first ends of the first and second robot arms, respectively;

first and second grippers, respectively mounted on the first and second tool replacement portions;

a work target loaded portion on which a work target is loaded, wherein the work target loaded portion is disposed under the first and second robot arms;

a moving module configured to move each of the first and second robot arms and the work target loaded portion; and a controller disposed inside the frame structure and configured to control the moving module, wherein the moving module includes:

first and second vertical moving units configured to respectively move the first and second robot arms in a vertical direction;

a third vertical moving unit configured to move the work target loaded portion in the vertical direction; and first and second horizontal moving units configured to move the work target loaded portion in a first horizontal direction and in a second horizontal direction orthogonal to the first horizontal direction, respectively, wherein the third vertical moving unit is disposed between the first and second vertical moving units.

\* \* \* \* \*

18